US 9,718,360 B2

(12) United States Patent
Yang

(10) Patent No.: US 9,718,360 B2
(45) Date of Patent: Aug. 1, 2017

(54) VEHICLE, DISPLAY DEVICE FOR VEHICLE, AND METHOD FOR CONTROLLING THE VEHICLE DISPLAY DEVICE

(71) Applicant: Hyundai Motor Company, Seoul (KR)

(72) Inventor: Hyun Seung Yang, Gyeonggi (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/563,565

(22) Filed: Dec. 8, 2014

(65) Prior Publication Data

US 2016/0077652 A1    Mar. 17, 2016

(30) Foreign Application Priority Data

Sep. 16, 2014 (KR) .................. 10-2014-0122559

(51) Int. Cl.
```
G06F 3/048      (2013.01)
B60K 35/00      (2006.01)
G06F 3/0488     (2013.01)
B60K 37/06      (2006.01)
```

(52) U.S. Cl.
CPC .............. *B60K 35/00* (2013.01); *B60K 37/06* (2013.01); *G06F 3/04886* (2013.01); *B60K 2350/1004* (2013.01); *B60K 2350/106* (2013.01); *B60K 2350/1016* (2013.01); *B60K 2350/1028* (2013.01); *B60K 2350/1072* (2013.01); *B60K 2350/1096* (2013.01); *B60K 2350/352* (2013.01)

(58) Field of Classification Search
None
See application file for complete search history.

(56) References Cited

U.S. PATENT DOCUMENTS

| | | | |
|---|---|---|---|
| 2011/0196578 A1* | 8/2011 | Strohmaier | B60K 35/00 701/48 |
| 2013/0314314 A1* | 11/2013 | Hamada | G09G 5/14 345/156 |
| 2014/0089832 A1* | 3/2014 | Kim | G06F 3/0481 715/769 |

FOREIGN PATENT DOCUMENTS

| | | |
|---|---|---|
| JP | H09325693 A | 12/1997 |
| JP | 2011-126473 A | 6/2011 |
| JP | 2012-006453 A | 1/2012 |
| JP | 2012-008743 A | 1/2012 |
| JP | 2013-518768 A | 5/2013 |
| KR | 2006-0097833 A | 9/2006 |
| KR | 2007-0059265 A | 6/2007 |

OTHER PUBLICATIONS

Korean Office Action for Korean Patent Application No. 10-2014-0122559, with English translation, 23 pages.

* cited by examiner

*Primary Examiner* — Joseph Haley
(74) *Attorney, Agent, or Firm* — Mintz Levin Cohn Ferris Glovsky and Popeo, P.C.; Peter F. Corless

(57) ABSTRACT

A vehicle, a vehicle display device, and a method for controlling the vehicle display device are disclosed. The vehicle display device includes a display unit and a controller. The display unit displays a wide screen that is divided into a main display region and an auxiliary display region. The controller displays a first visual interface on the main display region, decides the second visual interface for performing a process different from that of the first visual interface according to the first visual interface, and displays auxiliary information related to the second visual interface on the auxiliary display region.

23 Claims, 20 Drawing Sheets

VEHICLE, DISPLAY DEVICE FOR VEHICLE, AND METHOD FOR CONTROLLING THE VEHICLE DISPLAY DEVICE

CROSS-REFERENCE TO RELATED APPLICATION(S)

This application claims the benefit of Korean Patent Application No. 2014-0122559, filed on Sep. 16, 2014, in the Korean Intellectual Property Office, the disclosure of which is incorporated herein by reference.

BACKGROUND

1. Field

Embodiments of the present disclosure relate to a vehicle, a display device for the vehicle, and a method for controlling the vehicle display device. Preferably, a display unit displays a wide screen that is divided into a main display region and an auxiliary display region and a controller displays a first visual interface of a first application on the main display region, ascertains a second application different from the first application, and displays auxiliary information related to the second application on the auxiliary display region.

2. Description of the Related Art

In general, a vehicle is a machine which travels on roads or tracks to carry people, objects or animals from place to place. Vehicles may move in one direction according to rotation of at least one wheel. Such vehicles may include, for example, a three-wheeled or four-wheeled vehicle, a two-wheeled vehicle such as a motorcycle, a motorized bicycle, construction equipment, a bicycle, a train traveling on rails, and the like.

A display device may be installed on a vehicle in order to provide a driver and/or a passenger with various kinds of information such as a traveling route or a traveling state. Various kinds of information displayed on the display device may include various images or moving images stored in a storage unit embedded in the vehicle. The information may also include terrestrial broadcasting or satellite broadcasting, navigation information, vehicle state information such as a vehicle traveling speed or trip information, user convenience information such as weather and news, information about reproduction sound or radio broadcasting, etc.

The display device adapted to provide various kinds of information may be installed around a driver's seat such that a driver or passenger can easily recognize the display content. For example, the display device for use in the four-wheeled vehicle may be installed at various positions of a dashboard. Specifically, the display device may be installed at the top of a center console (also called a center fascia or dashboard). Of course, the display device can also be installed at other various positions.

SUMMARY

Various embodiments of the present disclosure are directed to providing a vehicle, a vehicle display device, and a method for controlling the same that substantially obviate one or more problems due to limitations and disadvantages of the related art.

Therefore, it is an aspect of the present disclosure to provide a vehicle display device to efficiently and effectively display various kinds of information for a user using a large-sized screen, a vehicle including the vehicle display device, and a method for controlling the vehicle display device.

It is another aspect of the present disclosure to provide a vehicle display device to effectively optimize various kinds of information for a user in response to a screen size, and to display and provide the optimized information to the user. Additional aspects of the subject disclosure will be set forth in part in the description which follows and, in part, will be obvious from the description, or may be learned by practice of the disclosure.

In accordance with one aspect of the present disclosure, a display device for a vehicle includes: a display unit to display a wide screen that is divided into a main display region and an auxiliary display region; and a controller to display a first visual interface of a first application on the main display region, ascertain a second application different from the first application, and to display auxiliary information related to the second application on the auxiliary display region.

If a second visual interface of the second application is displayed on the main display region, auxiliary information related to the first application different from the second application or auxiliary information related to a third application different from the second application may be displayed on the auxiliary display region.

The controller may display auxiliary information of a third application, instead of the auxiliary information related to the second application, on the auxiliary display region according to user manipulation or a predefined configuration. The third application may be different from the first application and the second application.

According to user manipulation or a predetermined configuration, the controller may extend the first visual interface to the main display region and the auxiliary display region, and may respectively display the first visual interface and information related to the first visual interface on the main display region and the auxiliary display region. The information related to the first visual interface may include a selection menu related to execution of the first application.

The controller may display a third visual interface of a third application on the main display region according to user manipulation or a predefined configuration. After the controller displays the third visual interface of the third application on the main display region and displays auxiliary information related to the second application on the auxiliary display region, the controller may display a second visual interface of the second application on the main display region and may display auxiliary information related to the third application on the auxiliary display region. The auxiliary information related to the second application may include summary information related to the second application. The summary information may be changeable according to user manipulation or a predefined configuration.

The display device may further include: a storage unit to store a plurality of visual interface layers corresponding to a plurality of visual interfaces and a plurality of auxiliary information layers corresponding to a plurality of auxiliary information related to the plurality of visual interfaces.

The controller may respectively select at least one of the plurality of visual interface layers and at least one of the plurality of auxiliary information layers according to user manipulation or a predefined configuration.

The first application and the second application may include at least one of a sound playback application, an information provision application, a radio application, a still image display application, a vehicle management application, a digital media broadcast playback application, a navigation application, a conversation application, a voice recognition application, and a reversing assistance application. The display unit may further include a gauge display region on which gauge information related to vehicle driving and associated images are displayed.

In accordance with another aspect of the present disclosure, a display device for a vehicle includes: a display unit to display a screen; and a controller to determine whether the screen is a general screen or a wide screen. The controller may also determine the size of a main display region of the screen and the size of an auxiliary display region of the screen according to the determined result. The controller may also display a first visual interface on the main display region, and display auxiliary information related to a second visual interface configured to perform processing different from that of the first visual interface on the auxiliary display region.

In accordance with another aspect of the present disclosure, a vehicle includes: a display unit to display a wide screen that is divided into a main display region and an auxiliary display region; and a controller to display a first visual interface of a first application on the main display region and to display auxiliary information related to a second application different from the first application on the auxiliary display region. The method for controlling the vehicle display device may relate to a method for controlling the vehicle display device including a display unit configured to display a wide screen that can be divided into a main display region and an auxiliary display region.

In accordance with another aspect of the present disclosure, a method for controlling a vehicle display device having a display unit configured to display a wide screen divided into a main display region and an auxiliary display region includes: determining a first visual interface of a first application; determining a second application; displaying the first visual interface on the main display region; and displaying auxiliary information related to the second application on the auxiliary display region, wherein the first application and the second application are configured to perform different processes. The method may include: if a second visual interface of the second application is displayed on the second application, displaying auxiliary information related to the first visual interface on the auxiliary display region.

The method may further include: if a second visual interface is displayed on the main display region, determining a third application, and displaying auxiliary information related to the third application on the auxiliary display region. The method may further include: displaying auxiliary information of a third application, instead of auxiliary information related to the second application, on the auxiliary display region, according to the user manipulation or the predefined configuration. The third application may be different from the first application and the second application.

The method may further include: according to the user manipulation or the predefined configuration, extending the first visual interface to the main display region and the auxiliary display region, and displaying the extended first visual interface. The method may further include: respectively displaying the first visual interface and information related to the first visual interface on the main display region and the auxiliary display region. The information related to the first visual interface may include a selection menu related to execution of the first application.

The method may further include displaying a third visual interface on the main display region according to the user manipulation or the predefined configuration. The method may further include: displaying a third visual interface on the main display region and displaying auxiliary information related to the second application on the auxiliary display region; and displaying a second visual interface of the second application on the main display region and displaying auxiliary information related to the third application on the auxiliary display region.

The displaying the first visual interface on the main display region and the displaying auxiliary information related to the second application on the auxiliary display region may include: selecting a visual interface layer corresponding to the determined first visual interface from among a plurality of visual interface layers, and displaying the selected visual interface layer on the main display region; selecting an auxiliary information layer corresponding to the auxiliary information of the second visual interface of the determined second application; and displaying the selected auxiliary information layer on the auxiliary display region. The method may further include displaying gauge information related to vehicle driving and associated images on a gauge display region.

It should be appreciated that the subject technology can be implemented and utilized in numerous ways, including without limitation as a process, an apparatus, a system, a device, a method for applications now known and later developed or a computer readable medium. These and other unique features of the system disclosed herein will become more readily apparent from the following description and the accompanying drawings.

BRIEF DESCRIPTION OF THE DRAWINGS

These and/or other aspects of the subject disclosure will become apparent and more readily appreciated from the following description of the embodiments, taken in conjunction with the accompanying drawings of which.

DETAILED DESCRIPTION

Figure 1:
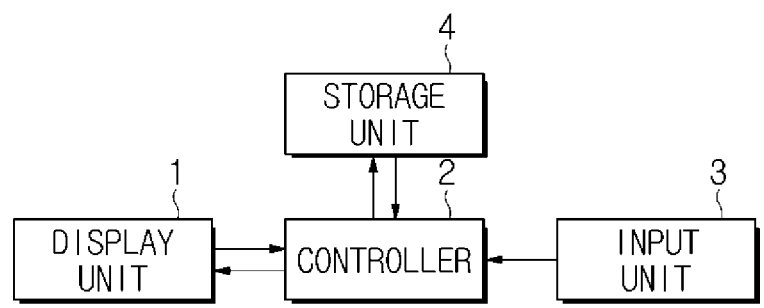
FIG. 1 is a block diagram illustrating a display device for a vehicle according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although an exemplary embodiment is described as using a plurality of units to perform the exemplary process, it is understood that the exemplary processes may also be performed by one or plurality of modules or units that are combined and arranged into fewer or more parts that provide the same functional advantages. Additionally, it is understood that the term controller/control unit refers to a hardware device that includes a memory, a processor and necessary peripheral hardware for operation of the same. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Reference will now be made in detail to the embodiments of the present disclosure, examples of which are illustrated in the accompanying drawings, wherein like reference numerals refer to like elements throughout.

In brief overview, the subject technology is directed to a display device for a vehicle (hereinafter referred to as a vehicle display device), and a method for controlling the vehicle and the vehicle display device. The following is described with respect to the vehicle display device being embedded in the vehicle but alternative arrangements such as a stand-alone portable unit are possible. The vehicle display device is installed in typical four-wheeled vehicles for convenience of description, but the scope or spirit of the embodiments of the present disclosure is not limited thereto. The vehicle display device may also be installed in other kinds of vehicles, for example, two-wheeled vehicles such as a motorcycle, a motorized bicycle, a bicycle, various kinds of construction equipment, a train, a ship, etc.

The vehicle display device may include a navigation device installed in a vehicle. In addition, the vehicle display apparatus may include a portable terminal which can be used by a user who rides in the vehicle or can be installed at a specific stand mounted to the inside of the vehicle. In this case, the portable terminal may include a cellular phone, a personal digital assistant (PDA), a smart phone, a tablet PC, a laptop computer, etc. In addition, the vehicle display apparatus may include various kinds of display devices that may be used in the vehicle.

A vehicle display device and a vehicle including the same according to the embodiments of the present disclosure will hereinafter be described with reference to FIGS. 1 to 3.

FIG. 1 is a block diagram illustrating a display device for a vehicle according to an embodiment of the present disclosure. The vehicle display device may include a vehicle display device 10, a display unit 1, a controller 2, an input unit 3, and a storage unit 4. The vehicle display device preferably has memory configured to store program instructions and a processor configured to execute the program instructions to accomplish an embodiment of the subject disclosure.

The display unit 1 may display symbols, letters or images for a user who is a driver or passenger of a vehicle. The display unit 1 may display various symbols, letters, and images for the user upon receiving a control signal from the controller 2.

A display screen of the display unit 1 may be implemented to have a variety of screen ratios. For example, the ratio (i.e., aspect ratio) of a vertical size to a horizontal size of the screen of the display unit 1 may be set to 1:1.25, 1:1.33, 1:1.41, 1:1.5, 1:1.60, 1:1.77, 1:2.39, 1:2.40 or 1:2.66, etc. In the following description, an aspect ratio of 1:2 or higher will hereinafter be referred to as wide screen. The screen ratio (i.e., aspect ratio) may be implemented in various ways according to the purpose and intention of a system designer. The screen size may also be determined according to the purpose and intention of the system designer. Although the screen size may be set to 9.2 inches or 12.3 inches on the basis of a diagonal width of the screen for convenience of description and better understanding of the present disclosure, the scope or spirit of the present disclosure is not limited thereto.

The screen of the display unit 1 may include a main display region and an auxiliary display region. In other words, the screen may be divided into a main display region and an auxiliary display region. In accordance with an embodiment, the screen may include the main display region and the auxiliary display region only, or may include the main display region, the auxiliary display region, and other display regions.

The display unit 1 may display a visual interface on the main display region, and may also display the auxiliary information on the auxiliary display region. In this case, the visual interface may connect the application driven by the vehicle display device to a user, or may be comprised of a combination of texts or images to visually provide the user with information corresponding to the application operation. In addition, the visual interface may visually provide the user with images about a variety of letters or icons in a manner that the user can input a desired command associated with the application operation. The auxiliary information may include a variety of information associated with the visual interface. For example, the auxiliary information may include summary information obtained by summarization of various information provided from the visual interface.

In accordance with the embodiment, the auxiliary information may also be set to auxiliary information related to other interference different from the visual interface displayed on the main display region. In other words, a visual interface based on the operation of a specific application and auxiliary information related to an application irrelevant to the specific application may be displayed on the screen of the display unit 1. For example, a visual interface of a navigation application may be displayed on the main display region, and auxiliary information related to digital media broadcasting (DMB) application different from the navigation application may be displayed on the auxiliary display region.

The display unit 1 may be implemented by various kinds of display panels known to those skilled in the art, for example, a liquid crystal display (LCD) panel, a thin film transistor-liquid crystal display (TFT-LCD) panel, a light emitting diode (LED) panel, an organic light emitting diode (OLED) panel, or the like.

The display unit 1 may also be implemented by combining a touch panel with the LCD panel, the TFT-LCD panel, the LED panel, or the OLED panel. If the display unit 1 is implemented as a touch panel, the display unit 1 detects the presence or absence of a touch action on the touch panel, and generates and outputs a predetermined electric signal on the basis of the detected touch action, so that the display unit 1 may receive a predetermined command from the user. In this case, the user may touch the touch panel using the user's finger or a touch pen. In addition, the touch action may include a touch action of a user who touches a specific position of the touch panel and a touch gesture performed on the touch panel.

If the display unit 1 is implemented as the touch panel, the display unit 1 may perform a screen display function and an input function of instructions or commands either at the same time or at different times. The display unit 1 may display a touch manipulation screen for guiding the user's touch. The touch manipulation screen may also be implemented by the above-mentioned visual interface. If the display unit 1 is implemented as a touch panel, the input unit 3 may be omitted. In accordance with the embodiment, the touch panel may be any one of a touch panel based on a resistive touchscreen which senses the user's touch manipulation by recognizing pressure, a touch panel based on a capacitive touchscreen which senses the user's touch manipulation based on the effect of capacitive coupling, a touch panel based on an optical touchscreen, or a touch panel based on an ultrasonic touchscreen which uses ultrasound.

The controller 2 may control a variety of operations of the vehicle display device. For example, the controller 2 may determine content to be displayed on the display unit 1 and control the display unit 1 according to the determined result, or may drive a variety of applications related to the vehicle display device and control the vehicle display device.

The controller 2 may transmit a control signal to the display unit 1 such that the controller 2 may control the display unit 1 to display predetermined symbols, letters or images thereon. The controller 2 may display the visual interface on the main display region, or may transmit a control signal to the display unit 1 configured to display auxiliary information on the auxiliary display region. In addition, the controller 2 may determine which application will be associated with a visual interface to be displayed on the main display region, and may determine which application will be associated with auxiliary information to be displayed on the auxiliary display region. Subsequently, the controller 2 may transmit a control signal to the display unit 1 according to the determined result, and may control the display unit 1 to display the visual interface on the main display region or control the display unit 1 to display auxiliary information on the auxiliary display region. In this case, the controller 2 may select and determine an application different from the visual interface as a specific application needed for displaying auxiliary information.

In more detail, the controller 2 may determine a first application to be used for displaying the visual interface thereon or a second application to be used for displaying the auxiliary information thereon. In this case, the controller 2 may select different applications as the first application and the second application. Subsequently, the controller 2 may obtain data regarding the visual interface of the first application and data regarding the auxiliary information of the second application according to the determined result. In this case, the controller 2 may read information stored in the storage unit 4 so as to obtain the visual interface of the first application and the auxiliary information of the second application. After the controller 2 obtains the visual interface of the first application and the auxiliary information of the second application, the controller 2 may generate a predetermined control command according to the obtained result and transmit the generated control command to the display unit 1.

After the controller 2 selects a visual interface to be displayed on each display region and the application related to auxiliary information, the controller 2 may select a plurality of visual interface layers corresponding to a plurality of visual interfaces and a plurality of auxiliary information layers corresponding to a plurality of auxiliary information. The display unit 1 may display the selected visual interface and the auxiliary information layer on the screen. The visual interface layer and the auxiliary information layer may also be stored in the storage unit 4 or the like.

In addition, the controller 2 may determine the screen ratio (i.e., the aspect ratio) of the display unit 1, and may adjust the sizes of the main display region and the auxiliary display region displayed on the display unit 1 according to the determined result of the screen ratio. In other words, the controller 2 may determine whether the display unit 1 is a general-sized screen or a wide screen, and may determine the sizes of the main display region and the auxiliary display region according to the determined result. The controller 2 may also determine the size of the visual interface and auxiliary information to be displayed on respective regions.

The controller 2 may receive a command from the user through the input unit 3, and may control the vehicle display device in response to the received command. For example, the controller 2 may receive either the selection command of the application related to the visual interface to be displayed on the main display region or the other selection command of the application related to auxiliary information to be displayed on the auxiliary display region from the user through the input unit 3. The controller 2 may also determine respective applications according to the respective selection commands.

The controller 2 may be implemented by a processor, such as a microprocessor, capable of performing a variety of operation processes. The processor may be implemented by at least one semiconductor chip or associated electronic components. The controller 2 may also include memory in communication with the processor.

The input unit 3 may receive a variety of commands for controlling the vehicle display device from the user. The input unit 3 may generate an electric signal corresponding to an input instruction or command, and transmit the electric signal to the controller 2. The input unit 3 may be implemented by various physical buttons, a physical keyboard, a virtual keyboard, a knob, a manipulation wheel, a stick-type manipulation device, a touchpad, a touchscreen, etc. The input unit 3 may be provided at various positions inside the vehicle. For example, the input unit 3 may be provided at a center console of the vehicle, a spoke 221 of a steering wheel 210, or the like.

The storage unit 4 may store a variety of information needed to operate the vehicle display device. For example, the storage unit 4 may store a variety of applications related to the vehicle display device and information related to the various applications. In addition, the storage unit 4 may store a plurality of visual interface layers corresponding to a plurality of visual interfaces and a plurality of auxiliary information layers corresponding to a plurality of auxiliary information related to the plurality of visual interfaces. The storage unit 4 may include multiple memory modules.

In accordance with the embodiment, at least one of the display unit 1, the controller 2, the input unit 3, and the storage unit 4 may also be implemented using a single physical device. For example, the display device may be a navigation device embedded in the vehicle, and the display unit 1 may be implemented by a display panel of the navigation device. In this case, the controller 2 may be implemented by a microprocessor of the navigation device, and the storage unit 4 may be implemented by a storage medium. The input unit 3 may also be implemented by an input unit such as a button mounted to the outside of the navigation device. For example, the display unit 1, the controller 3, and the storage unit 3 may be implemented by a single physical device. The input unit 3 may also be implemented by other devices, for example, a variety of physical buttons mounted to the center console of the vehicle.

In accordance with the embodiment, the display unit 1, the controller 2, the input unit 3, and the storage unit 4 may also be implemented by separate devices physically separated from each other. In other words, the display unit 1, the controller 2, the input unit 3, or the storage unit 4 may be embedded in or installed at different housings from among a plurality of housings installed inside the vehicle. For example, the controller 2 may also be implemented by either a dashboard 200 physically separated from the display unit 1 or various semiconductor chips and circuits installed in a gear box 230. In addition, the controller 2 may also be implemented by electronic control systems (ECS) contained in the vehicle.

Figure 2:
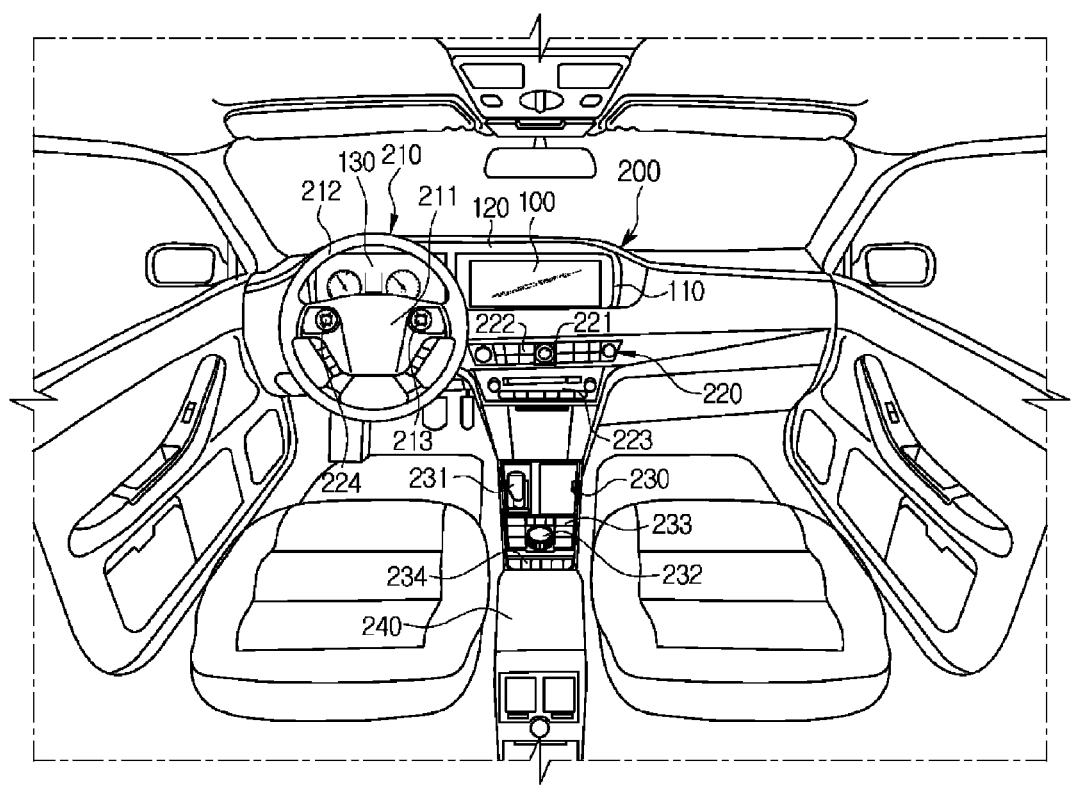
FIG. 2 is a view illustrating the interior of the vehicle according to an embodiment of the present disclosure.
Figure 3:
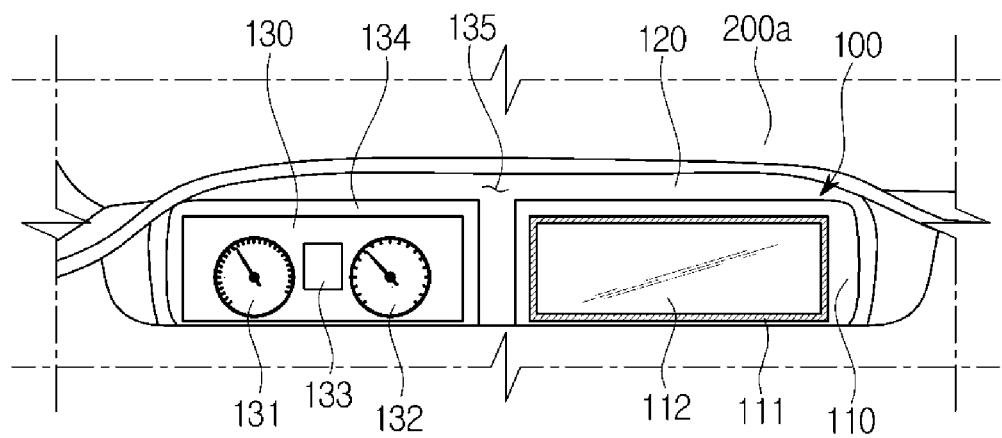
FIG. 3 is a view illustrating some parts of a vehicle dashboard in which a wide-screen display device is installed according to an embodiment of the present disclosure.

The description now refers to FIGS. 2 and 3. FIG. 2 is a view illustrating the internal structure of the vehicle according to an embodiment of the present disclosure. FIG. 3 is a view illustrating some parts of a vehicle dashboard in which a wide-screen display device is installed according to an embodiment of the present disclosure.

The display unit 100, the dashboard 200, the steering wheel 210, etc. may be installed in the vehicle. Although various other devices may also be installed in the vehicle, the scope or spirit of the present disclosure is not limited thereto, and a detailed description thereof will herein be omitted for convenience of description.

The display unit 100 may display and provide a variety of information to the user. The display unit 100 may include a display panel 112, a bezel 111 provided in the vicinity of the display panel 112, and an external housing 110 configured to fix the display panel 112 as well as to interconnect the display unit 100 and an upper frame 120.

As shown in FIG. 2, the display 100 may be installed in the dashboard 200 of the vehicle. In more detail, the display unit 100 may be installed at the top of the center console 220. In accordance with the embodiment, the display unit 100 is embedded in the dashboard 200, and may be installed at the top of the center console 220. In this case, all or some parts of the display unit 100 may be exposed to the outside as necessary. In accordance with another embodiment, the display unit 100 may be installed at the top of the center console 220 using a stand (or cradle) composed of a predetermined frame. In this case, one end of a frame of the stand is fixed to the housing of the display device 100, the other end of the frame is fixed to an inner lateral surface of a windshield and an upper surface of the dashboard 100, and the display unit 100 may be fixed to the top of the center console 220.

Referring to FIG. 3, the display unit 100 may also be installed at an inner lateral direction of the upper frame 120 of the dashboard 200 having a constant shape. Although the display unit 100 is installed at the top of the center console 220 for convenience of description and better understanding of the present disclosure, the installation position of the display unit 100 is not limited to the top of the center console 220. For example, the display unit 100 may be installed at the top of a glove box, may also be installed at the back surface of each headrest of a driver's seat and a passenger seat, and may also be installed at a console box 240. Besides, the display unit 100 may be installed at various positions as decided by the system designer.

In accordance with the embodiment, various electronic components for controlling the display unit 100 may be installed inside the dashboard 200. Various electronic components may include at least one of a semiconductor chip, a switch, an integrated circuit (IC), a resistor, a volatile or non-volatile memory, a printed circuit board (PCB), etc. At least one of the semiconductor chip, the switch, the integrated circuit (IC), the resistor, the volatile or non-volatile memory, etc. may be arranged and printed on the printed circuit board (PCB).

The dashboard 200 serves to separate the interior of the vehicle from an engine compartment. The dashboard 200 is installed at the front of the driver's seat and the passenger seat, and includes a plurality of electronic components needed for vehicle driving. The dashboard 200 may include a top panel (i.e., gauge panel), a center console 220, a gear box 230, etc. The gauge panel of the dash board 200 is located below a windshield, and may include a ventilation hole of an air-conditioner, a glove box, various instrument panels, etc. The center console 220 may be extended from the top panel. An array of input units 221, 222 such as physical buttons for controlling the vehicle, but also the radio device 223 may be provided at the center console 220. The center console 220 may be generally disposed between the driver's seat and the passenger seat. The gear box 230 may be located below the center console 220 between the driver's seat and the passenger seat. The gear box 230 may include a gear knob 231, input units 232-234 and the like.

Various electronic components for controlling the display unit 100 may be installed inside the dashboard 200. Various electronic components may include at least one of a semiconductor chip, a switch, an integrated circuit (IC), a resistor, a volatile or non-volatile memory, a printed circuit board (PCB), etc. At least one of the semiconductor chip, the switch, the integrated circuit (IC), the resistor, the volatile or non-volatile memory, the printed circuit board (PCB), and the like may be arranged or printed on the PCB.

The steering wheel 210 may be installed at the front of the driver's seat, and may include a rim 212 grasped by a vehicle driver, and a spoke 211 configured to interconnect the rim 212 and the steering device. The input units 213, 214, such as a physical button or a touchpad, may be installed at the spoke 211. The input units 213, 214 may also not be installed at the spoke 211.

The user may select or change content display on the display unit 100 using the input units 213, 214 of the spoke 211, the input units 221, 222 of the center console 220, the input unit of the radio device 223, and/or the input units 223, 224 of the gear box 230. The input units 213, 214 of the spoke 211, the input units 221, 222 of the center console 220, the input unit of the radio device 223, and the input units 223, 224 of the gear box 230 may include physical buttons, physical keyboards, virtual keyboards, knobs, manipulation wheels, stick-type manipulation devices, touchpads, touchscreens, etc.

Referring to FIG. 3, a gauge panel 130 may be installed at a lateral surface of the display unit 110. The gauge panel 130 may be mounted to the dashboard located at the rear of the steering wheel 210. The gauge panel 130 may include a speedometer 131, a tachometer 132, and an information display 133.

The information display 133 may include a display unit configured to provide a variety of information such as mileage, average speed, fuel efficiency, etc. The display unit may be implemented by a variety of display panels, for example, a liquid crystal display (LCD) panel, a TFT-LCD panel, an LED panel, and an OLED panel, etc. The gauge panel 130 may include a gauge frame 134 having a predetermined shape. The gauge frame 134 may stably fix various electronic components related to the gauge panel. For example, the speedometer 131, the tachometer 132, the information display 133, or a circuit board and microprocessor for controlling the speedometer 131, the tachometer 132, and the information display 133 may be stably fixed to the gauge panel by the gauge frame 134. The gauge frame 134 may be coupled to an upper frame 120 of the dashboard 200, such that the gauge panel 130 may be fixed to the upper frame 120. The gauge frame 134 may be installed at a specific position at which the driver can easily view the gauge panel 130.

An exemplary screen image displayed on the display unit 100 will hereinafter be described with reference to FIGS. 4 and 5.

Figure 4:
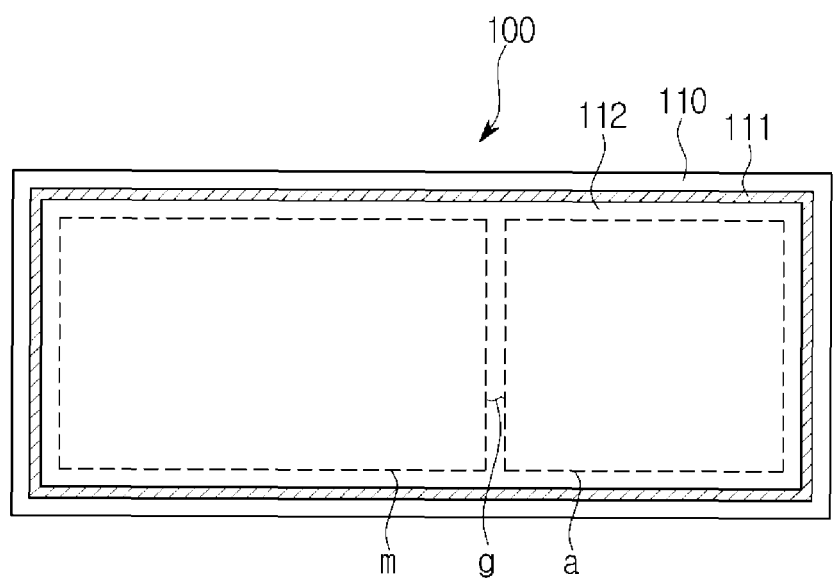
FIG. 4 is a view illustrating respective regions of the wide screen of the display device according to an embodiment of the present disclosure.
Figure 5:
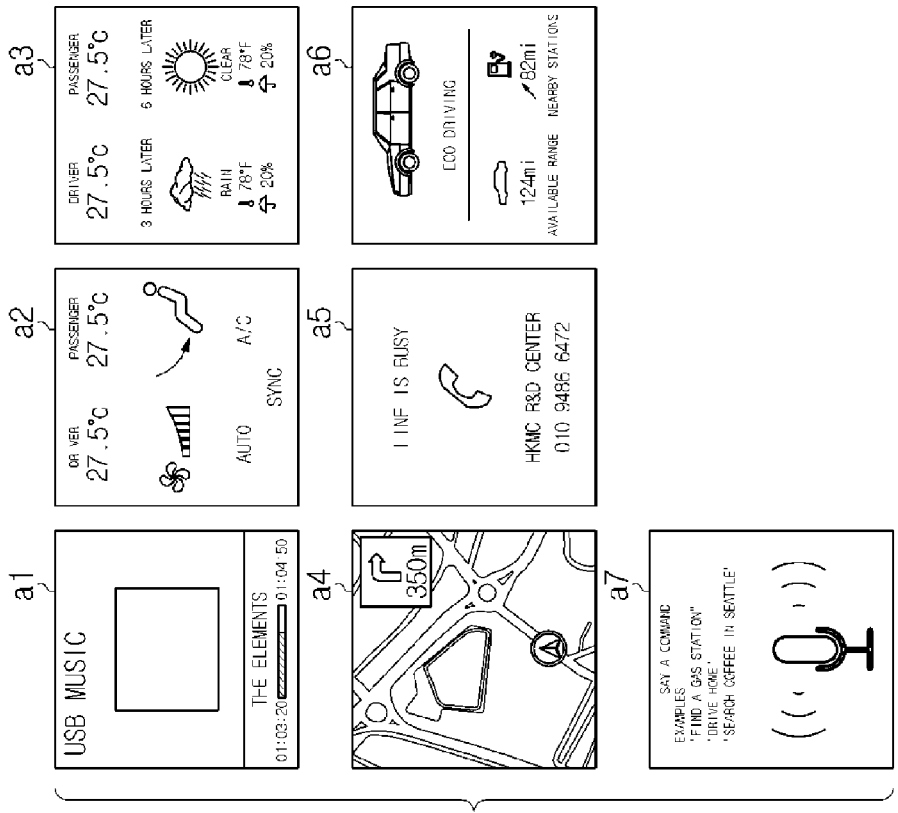
FIG. 5 is a view illustrating auxiliary information displayed on an auxiliary display region of the wide screen according to an embodiment of the present disclosure.
Figure 5:
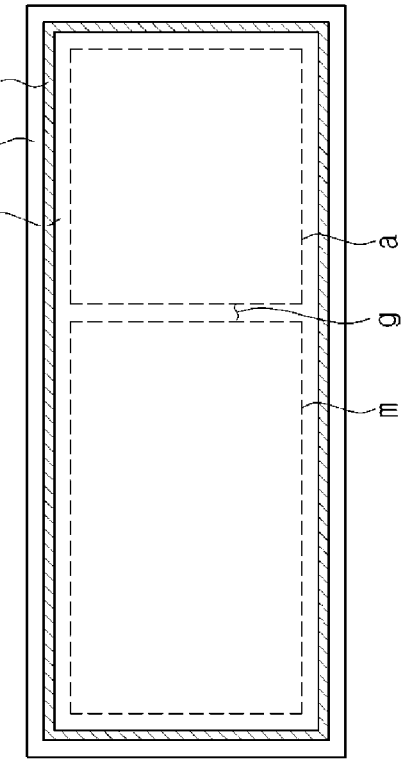

Referring to FIGS. 4 and 5, the display unit 100 may include an external housing 110, a bezel 111, and a display panel 112. The external housing 110 may be configured to fix the display panel 112. The various electronic components for controlling the display unit 100 may be embedded in the external housing 110. For example, the various electronic components may include at least one of a semiconductor chip, a switch, an IC, a resistor, a volatile or non-volatile memory, a PCB, etc. At least one of the semiconductor chip, the switch, the IC, the resistor, the volatile or non-volatile memory, the PCB, etc. may be arranged or printed on the PCB. The bezel 111 may be used to fix the display panel 112 in the vicinity of the display panel 112. The bezel 111 may be omitted as necessary. The display panel 112 may emit the light in response to an external signal, and output a screen image including predetermined letters, symbols, or images to the outside, such that the display panel 112 may provide the user with necessary information.

The screen displayed on the display panel 112 of the display unit 1 may be a wide screen. In this case, the display panel may have an appropriate ratio and size needed for outputting a widescreen image. The widescreen image may be relatively longer in horizontal width than a general screen image, so that a large-sized screen image can be displayed. The aspect ratio of a wide screen may be 1:1.60, 1:1.77 or 1:2.39, etc. The wide screen may have a variety of aspect ratios according to vehicle type, dashboard size, or selection of the designer. In one embodiment, the size of the wide screen is 12.3 inches. However, the wide screen size of the present disclosure is not limited thereto, and may be diversified for various reasons.

The screen image displayed on the display unit 1 may include a main display region (m) and an auxiliary display region (a). If the wide screen is applied to the display unit 1, the main display region (m) may be arranged at the left side of the display screen as shown in FIGS. 4 and 5. In this case, the auxiliary display region (a) is arranged at the right side. Alternatively, the main display region (m) may be arranged at the right side, and the auxiliary display region (a) may be arranged at the left side. The positions of the main display region (m) and the auxiliary display region (a) may be decided by selection of the system designer and/or the user. The positions of the main display region (m) and the auxiliary display region (a) may be changed by user manipulation as necessary.

The main display region (m) and the auxiliary display region (a) may be installed at an upper part and a lower part of the screen, respectively. In this case, the positions of the main display region (m) and the auxiliary display region (a) may be decided either by selection of the system designer and/or by selection of the user. In accordance with the embodiment, a predetermined gap (g) may be present between the main display region (m) and the auxiliary display region (a), or no predetermined gap (g) may be present therebetween.

A visual interface of various applications driven by the vehicle display device may be displayed on the main display region (m). The visual interface of various applications may be comprised of one or more letters, symbols, or images, and may be designed to satisfy the aesthetic sense of the user. The visual interface may include a graphical user interface (GUI).

The visual interface may provide the user with various types of data or one or more guide images obtained by driving of the application using letters, symbols, still images or moving images. The information obtained by the driven application may include media information such as reproduced music or moving images, information regarding a radio channel or digital media broadcast channel, a digital media broadcast moving image or a moving image stored in the vehicle display device, various still images stored in the vehicle display device, letters, symbols or images related to vehicle interior information, a navigation map and associated information, call-related information I (such as reception or non-reception of the call), information captured by a rear camera, information needed for assisting a reversing operation, etc. The guide image may indicate letters (such as icon) or images to represent a menu capable of being selected for application manipulation. For example, the guide image may include an image indicating a media playback button, an image indicating a mode change button, or an image indicating designation change selection, etc.

If the vehicle display device uses a touch panel, the visual interface may include a touch manipulation screen image for guiding the user's touch action.

The application may include at least one of a sound playback application, an information provision application, a radio application, a still image display application, a vehicle management application, a digital media broadcast playback application, a navigation application, a call (or conversation) application, a voice recognition application, and a reversing assistance application. Besides, many more applications may also be used as selected by the system designer. A unique visual interface for each application may also be created.

The sound playback application may be a set of programs needed to reproduce various sounds such as music. The sound playback application may reproduce sound using media files that are pre-stored either in various storage units (e.g., RAM or ROM) embedded in the vehicle display device or in a separate storage medium such as a compact disc (CD) or mp3 player, and may receive external data and reproduce sound corresponding to the received data using a streaming scheme.

The information provision application may be a set of programs needed to provide various kinds of information for user convenience. The information provision application may provide a variety of user-desired information, for example, weather, memorandum, date, time, calendar, various news, and stock index or exchange rate information, as shown in exemplary window (a3) of FIG. 5. The provision information may be changed according to selection of the designer or user.

The radio application may be a set of programs needed to reproduce radio broadcast data related to received radio waves.

The still image display application may be a program for displaying still images stored in various storage units (such as RAM or ROM) embedded in the vehicle display device or a separate storage medium such as a compact disc (CD), so that the user can view the displayed still images.

The vehicle management application may be a set of programs, which can display various information related to vehicle control, generate a control signal of various components inside the vehicle according to user input, and transmit the control signal. For example, the vehicle management application may be an application for displaying information related to a temperature of the interior of the vehicle and generating various instructions needed for controlling the air-conditioner. In addition, the vehicle management application may be an application to obtain/display a variety of information of the interior of the vehicle, for example, remaining fuel quantity, mileage, fuel efficiency, accumulated mileage, an average traveling speed, time of journey and the like.

The digital media broadcast playback application may be a set of programs needed for reproducing the digital media broadcasting according to the received digital media broadcast frequency.

The navigation application may be a set of programs that acquires/generates/displays a path from a departure to a destination. The navigation application may also indicate a condition of peripheral roads, the position of a current vehicle position, a traveling direction of a current direction, a vehicle traveling speed, etc., and may further provide various information regarding roads or peripheral construction as necessary and available.

The conversation application may be a set of programs through which the user who rides in the vehicle can make a phone call to another party without using a terminal such as a smartphone through the vehicle display device. The conversation application preferably communicates with an external cellular phone or smartphone according to the Bluetooth communication scheme, such that the user can make a phone call to another party through the vehicle display device. The conversation application can allow the user to make a phone call to another party using a communication chip or antenna directly embedded in the vehicle display device.

The voice recognition application may be a set of programs that can recognize user voice, generate a command according to the recognized voice, and transmit the command to various electronic components inside the vehicle. The voice recognition application can recognize and interpret voice input, that is received through the vehicle display device or the voice input device such as a microphone installed at a specific position of the interior of the vehicle, using various methods known to those skilled in the art, such that the voice recognition application can generate a command corresponding to the interpreted voice.

The reversing assistance application may collect data from the reverse camera or data detected by various sensors, and provide the user with the collected data and information based on the collected data. Thus, the reversing assistance application is a set of programs that aids the user to easily drive the vehicle in reverse.

The visual interface displayed on the main display region (m) may be changed according to user selection or predetermined configuration. The user may change the visual interface displayed on the main display region (m) either using various input units 213, 214, 221, 222, 232-234 embedded in the interior of the vehicle or using the input unit contained in the housing 110 of the vehicle display device. If the vehicle display device uses a touch panel, the user may change a currently displayed visual interface to another visual interface by touching the touch panel. For example, the user conducts a swipe gesture on the touch pad, so that the visual interface regarding a currently displayed application may be changed to a visual interface regarding another application.

As shown in FIG. 5, various auxiliary information (a1 to a7) related to various applications driven in the vehicle display device may be displayed on the auxiliary display region (a). The auxiliary information (e.g., windows a1 to a7) may indicate specific information for assisting the visual interface of various applications. Accordingly, the auxiliary information (a1 to a7) may be information related to the visual interface of various applications.

In accordance with the embodiment, the auxiliary information (a1 to a7) may include summary information regarding a variety of information to be provided from the visual interface. The auxiliary information (a1 to a7) may be only some parts of various information displayed on the visual interface. In this case, some information may be selected by the system designer or the user as necessary.

For example, the sound playback application may display a guide image for receiving various commands related to various operations, as some parts of the visual interface. For example, the various commands may relate to reproduced media, current playback media, media to be reproduced in future, information related to media denoted by various letters or images, a total number of media, a total playback time, a playback time of total media, a selected playback mode, or media playback. The auxiliary information (a1) related to the sound playback application may display only some parts of the above-mentioned information, i.e., a current playback medium, a playback time, and information regarding a current playback position.

The auxiliary information (a1 to a7) may include a list of various selectable menus provided from the visual interface. For example, the auxiliary information (a) related to the sound playback application may include letters, symbols, or images indicating the list of user-selectable menus, for example, playback of previous-order media, playback of the next-order media, repeated playback of specific media, section repeat playback, pause function of media playback, stop of a sound playback application operation, mode switching, change of media play list, and the like.

The auxiliary information (a1 to a7) displayed on the auxiliary display region may be changed according to user manipulation. For example, the user may directly manipulate various input units 213, 214, 221, 222, 232-234 embedded in the vehicle so as to change the auxiliary information (a1 to a7) displayed on the auxiliary display region. In another example, if a touch panel is applied to the vehicle display device, the user touches the touch panel in such a manner that the auxiliary information (a1 to a7) displayed on the auxiliary display region can be changed to other information. In addition, the user may also change content of the auxiliary information (a1 to a7). For example, if content of the auxiliary information (a1) related to the sound playback application is a current playback medium, the user may change content of the auxiliary information (a1) so that a current playback medium can be changed to the next playback medium to be subsequently reproduced.

Various examples of the auxiliary information (a1 to a7) capable of being displayed on the auxiliary display region (a) are shown in FIG. 5. For example, auxiliary information (a1)related to the sound playback application, auxiliary information (a2) related to the air-conditioner control application, auxiliary information (a3, a6) related to the information provision application, auxiliary information (a4) related to the navigation application, auxiliary information (a5) related to the conversation application, and the voice recognition application (a7) may be shown as the auxiliary information in FIG. 5. However, the auxiliary information capable of being displayed on the auxiliary display region (a) is not limited thereto, and the auxiliary information related to various applications may be displayed on the auxiliary information display region (a).

In the following description, different visual interfaces may indicate that applications related to the visual interface are different from each other, and different auxiliary information may indicate that applications or visual interfaces related to the auxiliary information are different from each other. In addition, the auxiliary information related to the visual interface may indicate that the visual interface and the auxiliary information belong to the same application.

In accordance with the embodiment, the auxiliary information (a1 to a7) displayed on the auxiliary display region (a) may be associated with the visual interface (hereinafter referred to as a second visual interface) of the application different from the visual interface (hereinafter referred to as a first visual interface) of a predetermined application displayed on the main display region (m). In other words, if the visual interface of the navigation application is displayed on the main display region (m), other auxiliary information (a1 to a3, a5 to a7) instead of the navigation-related auxiliary information (a4) may be displayed on the auxiliary display region (a). Therefore, information regarding a plurality of applications may be provided to the user through one screen image. Accordingly, the user can easily obtain a variety of information through only one screen image, resulting in increased user convenience. In addition, the user who drives the vehicle need not frequently conduct inconvenient manipulation in response to provision of various information, so that the user can safely drive the vehicle.

In accordance with the subject disclosure, the visual interface displayed on the main display region (m) may be changed according to user manipulation or predetermined configuration. In other words, the visual interface of the application different from the first visual interface displayed on the main display region (m) may be displayed, instead of the first visual interface.

If the visual interface different from the first visual interface displayed on the main display region (m) is displayed instead of the first visual interface, the auxiliary information displayed on the auxiliary region (a) may also be changed.

If the newly changed visual interface is a second visual interface through which the auxiliary information is displayed on the auxiliary display region (a), information displayed on the main display region (m) may overlap with the information displayed on the auxiliary display region (a). Therefore, the auxiliary information displayed on the auxiliary display region (a) is other information but not the auxiliary information related to the second visual interface. For example, auxiliary information related to the first visual interface and auxiliary information related to the third visual interface may be displayed as the other information.

For example, when the visual interface related to the media playback application is displayed on the main display region (m) and auxiliary information related to the information provision application is displayed on the auxiliary display region (a), if the visual interface related to the information provision application is displayed on the main display region (m) according to user manipulation or the like, the auxiliary information related to the media playback application and other auxiliary information related to other applications may be displayed on the auxiliary display region (a).

If the newly changed visual interface is a fourth visual interface different from the second visual interface, the auxiliary information displayed on the auxiliary display region (a) may be changed or may remain unchanged. Information on whether the auxiliary information is changed may be decided according to selection of the system designer or the user.

If the newly changed visual interface is a second or fourth visual interface through which the auxiliary information is displayed on the auxiliary display region (a), and if the auxiliary information is changed, the changed auxiliary information may be based on a configuration predefined by the system designer or the user. For example, if the first visual interface displayed on the main display region (a) is changed, a processor configured to control the vehicle display device may sequentially read a plurality of auxiliary information, and may decide auxiliary information to be displayed on the auxiliary display region (a). For example, the processor may determine whether the corresponding information is identical to the auxiliary information related to a newly changed second or fourth visual interface in the order of a map including a path to a destination → current playback media → a map not including the path to the destination → state information of the air-conditioner, such that the auxiliary information to be displayed on the auxiliary display region (a) may be decided according to the determined result.

In accordance with the embodiment, the auxiliary information to be displayed in the auxiliary display region (a)

may be changed according to user manipulation or predefined configuration. In other words, the auxiliary information of the application different from the auxiliary information of the legacy application may be displayed on the auxiliary display region (a).

In this case, if the auxiliary information displayed in the auxiliary display region (a) is changed, the auxiliary information related to the first visual interface displayed on the main display region (m) may not be displayed in the auxiliary display region (a). For example, if the first visual interface is the visual interface of the navigation application, the auxiliary information displayed in the auxiliary display region (a) may not include the auxiliary information of the navigation application. Therefore, information displayed in the main display region (m) may not overlap with other information displayed in the auxiliary display region (a). The processor for controlling the vehicle display device may skip or deactivate the auxiliary information related to the first visual interface according to the first visual interface displayed in the main display region (m), so that the auxiliary information may not be selected by user manipulation or the processor.

In accordance with the subject disclosure, the display 100 may be extended to a specific position at which the gauge panel 130 is located as shown in FIG. 3. In this case, the display unit 100 may further include a gauge display region for displaying a variety of gauge information (for example, a traveling speed, the number of revolutions per minute of an engine, a mileage, an average speed, and fuel efficiency) and associated images. In this case, the above-mentioned physical gauge panel 130 may be omitted as necessary.

Figure 6A:
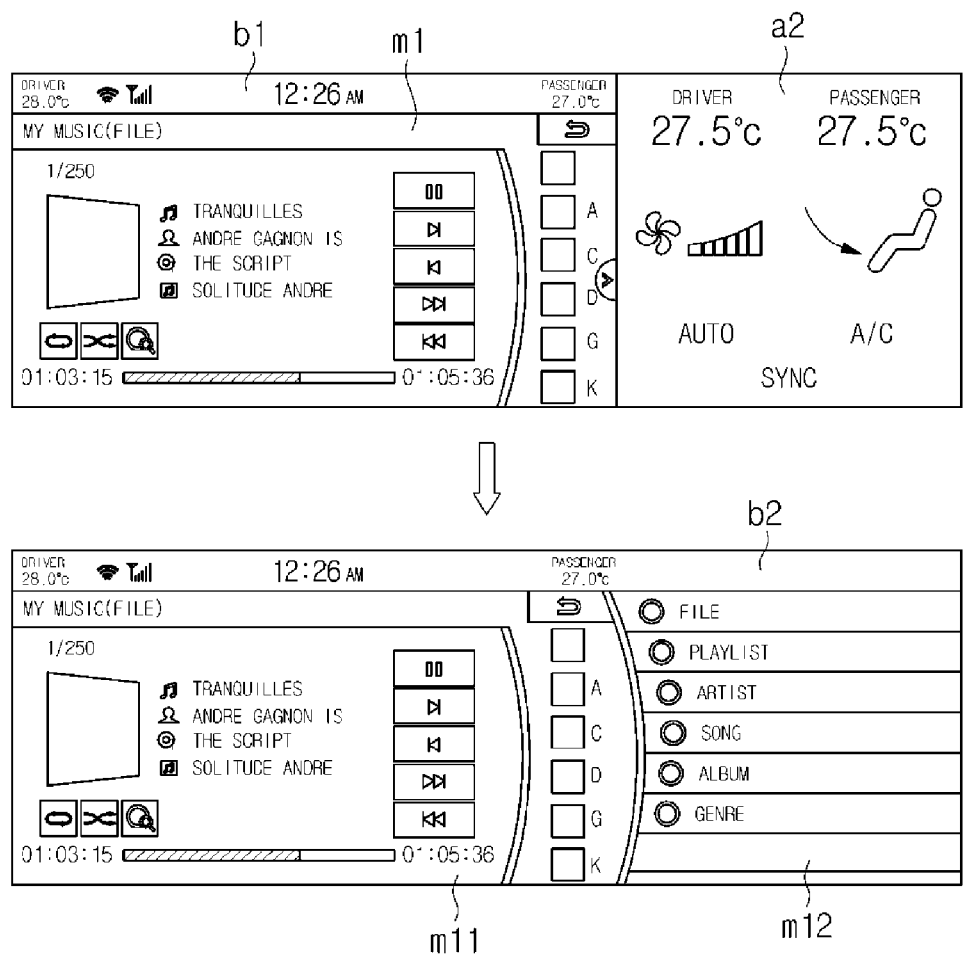
FIGS. 6A to 6F illustrate examples in which a visual interface is displayed on a main display region and an auxiliary display region according to an embodiment of the present disclosure.

The operations of the vehicle display device according to various embodiments of the present disclosure will hereinafter be described with reference to FIGS. 6A to 7. FIGS. 6A to 6F illustrate examples in which a visual interface is displayed on a main display region and an auxiliary display region according to an embodiment of the present disclosure.

In accordance with the subject disclosure, the visual interface may also be extended to both of the main display region (m) and the auxiliary display region (a). The visual interface may be extended according to user manipulation or predefined configuration. If the visual interface is extended, letters, symbols, or images of the visual interface are horizontally elongated or shifted to other positions, so that the visual interface may be extended. A new image such as a selection menu related to the visual interface may be added to the auxiliary display region (a), so that the visual interface may also be extended.

For example, as can be seen from FIG. 6A, under the condition that the visual interface (m1) of the sound playback application is displayed in the main display region and the auxiliary information (a2) related to the air-conditioner control application is displayed in the auxiliary display region, if the user manipulates various input units 213, 214, 221, 222, 232-234 embedded in the vehicle or conducts a swipe gesture on the touch panel, or if the user selects a desired function by touching a setup button of the screen using the input units 213, 214, 221, 222, 232-234, the visual interface (m1) of the sound playback application is extended so that the extended visual interface may be displayed on both of the main display region and the auxiliary display region. In this case, not only the legacy display part (m11) but also the additional part (m12) related to the sound playback application (e.g., various selection menus related to sound playback) may be further displayed. The visual interface is effectively extended. In this case, if the visual interface (m1) is extended, an additional interface (e.g., an upper bar b1) separated from the visual interface (m1) may also be extended as denoted by a specific part (b2), which creates a unified appearance.

Figure 6B:
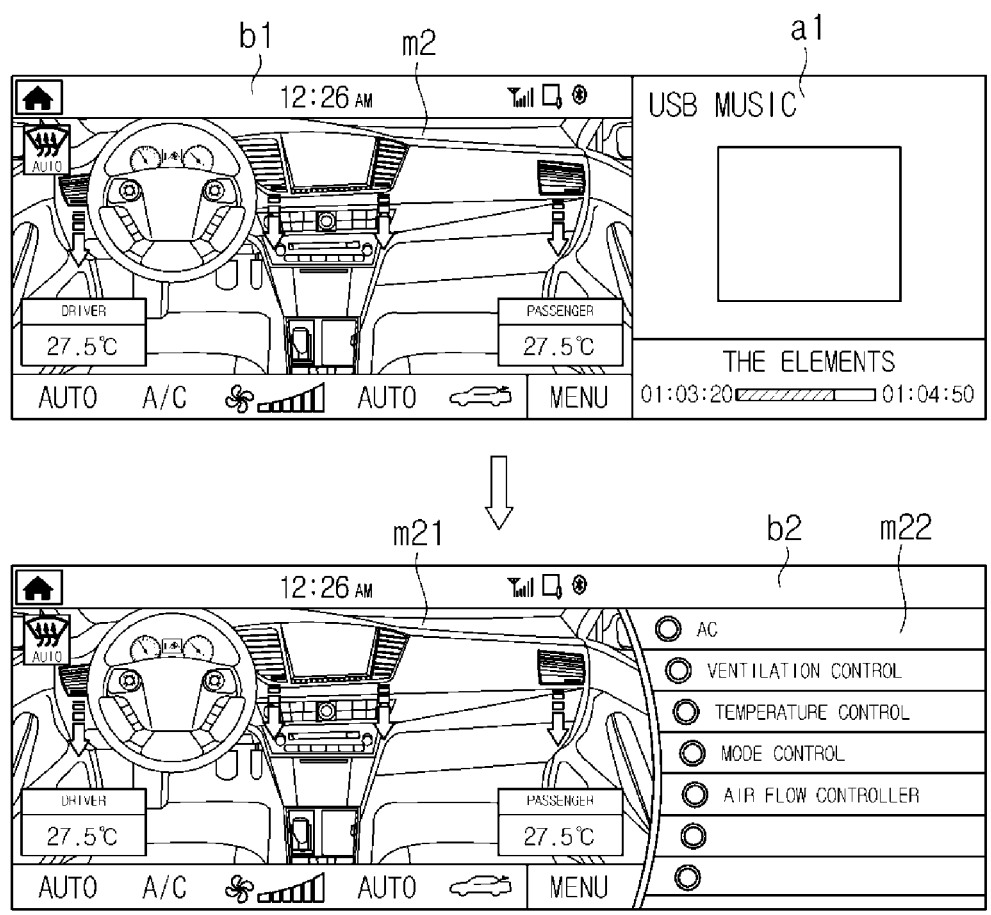

In another example, under the condition that the visual interface (m2) of the air-conditioner control application is displayed on the main display region and the auxiliary information (a1) related to the sound playback application is displayed on the auxiliary display region as shown in FIG. 6B, if the user manipulates various input units 213, 214, 221, 222, 232-234 or otherwise inputs a request for modification, the visual interface (m2) of the air-conditioner control application may also be equally extended so that the visual interface (m2) may be displayed on both the main display region and the auxiliary display region. As described above, the visual interface (m2) of the air-conditioner control application, the legacy display region (m21), the additional part (m22) related to air-conditioning control, and the configuration change menu related to the air-conditioner are simultaneously displayed, so that the visual interface can be extended. If the visual interface (m2) is extended as described above, an additional interface separated from the visual interface (m2), for example, the upper bar (b1), may also be extended as denoted by a specific part (b2).

Figure 6C:
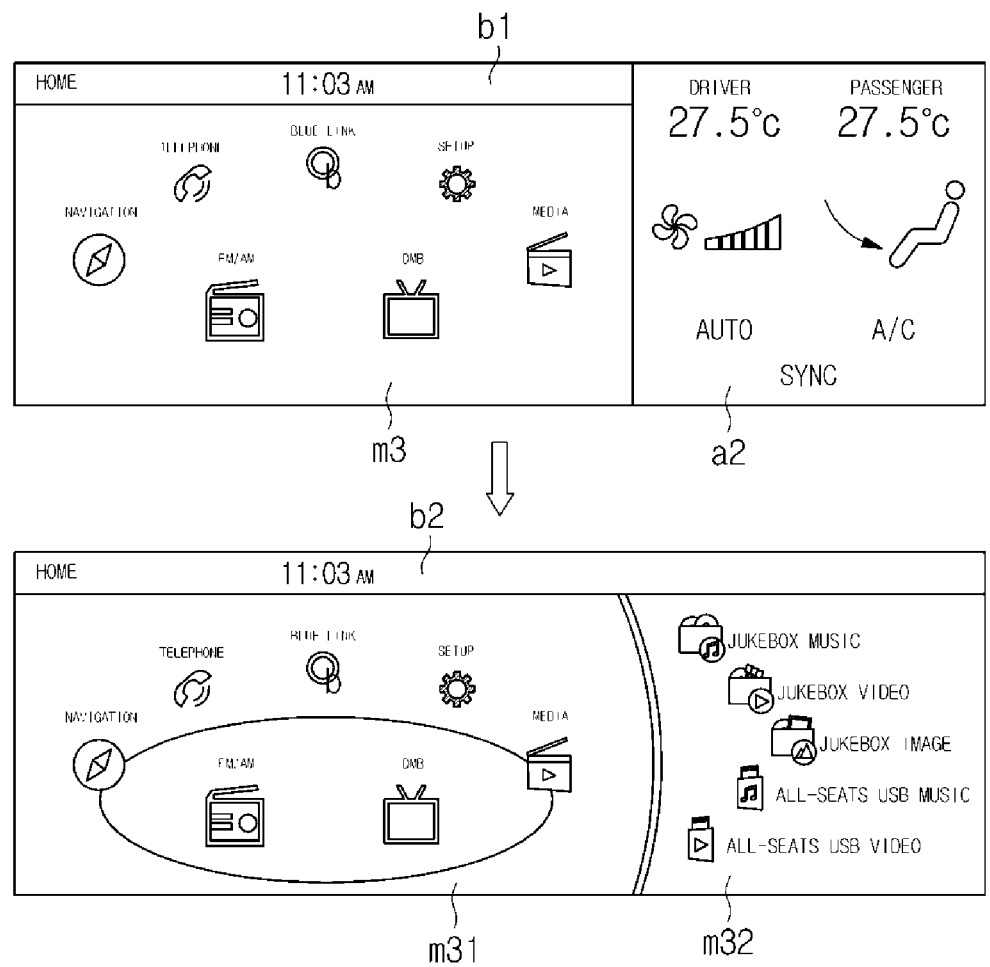

In another example, if a selection screen image (m3) serving as the visual interface including a plurality of images indicating individual applications is displayed on the main display region as shown in FIG. 6C, and if the auxiliary information (a2) related to the air-conditioner control application is displayed on the auxiliary display region, the user can utilize various input units 213, 214, 221, 222, 232-234 so that any one of a plurality of images displayed on the main display region can be brought into focus. As a result, instead of auxiliary information (a2) related to the air-conditioner control application, a lower menu (i.e., a sub menu) regarding the application corresponding to a focus-moved image may also be displayed as the auxiliary information (m32) in the auxiliary display region. In other words, the selection screen image (m3) may be extended to the auxiliary display region. If the visual interface (m3) is extended in the same manner as described above, an additional interface different from the visual interface (m3), for example, the upper bar (b1), may also be extended as shown in (b2).

Figure 6D:
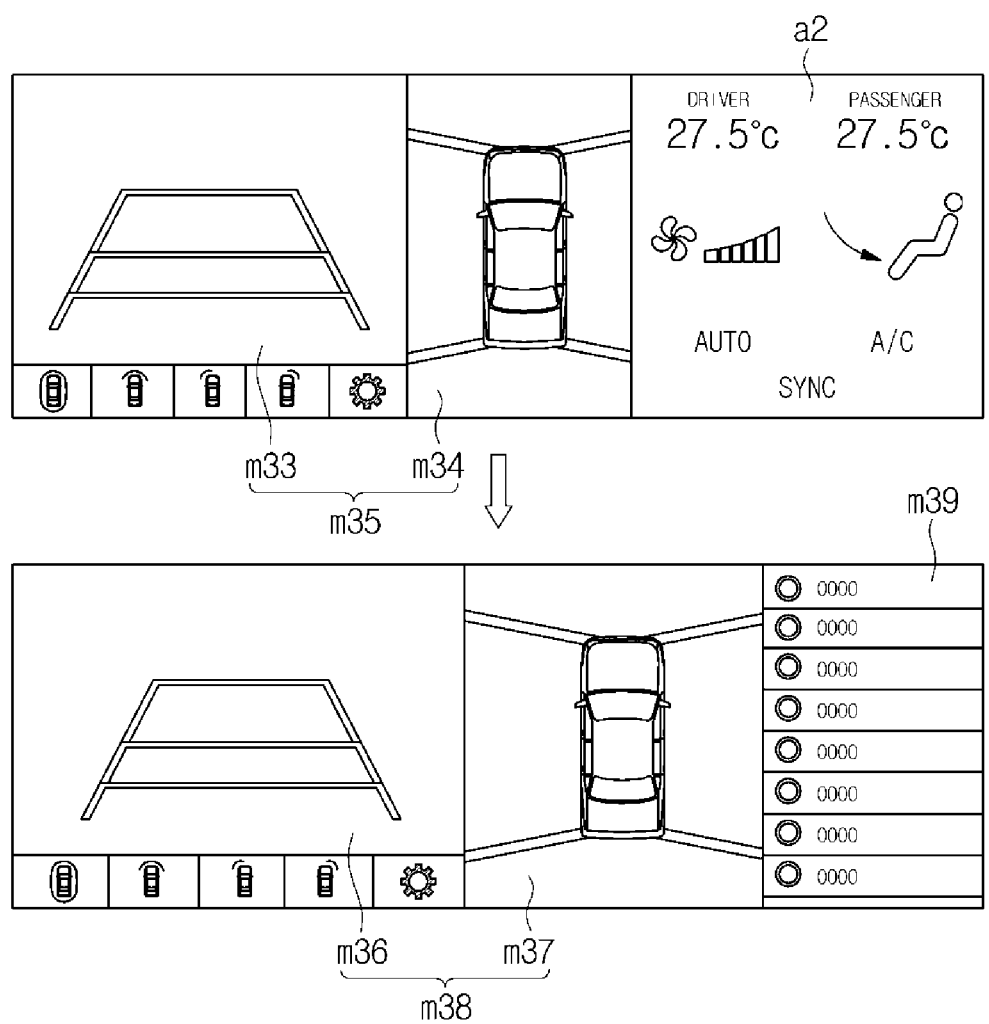

In another example, as shown in FIG. 6D, the visual interface (m35) of the reversing assistance application may be displayed on the main display region, and the auxiliary information (a2) related to the air-conditioner control application may be displayed on the auxiliary display region. In this case, the visual interface (m35) of the reversing assistance application may provide a variety of information needed for reverse traveling. For example, the reverse image (m33) captured by the reverse camera and the vehicle-peripheral information (m34) detected by various sensors are shown in FIG. 6D. In this case, if the user manipulates various input units 213, 214, 221, 222, 232-234 or touches the touch panel, the visual interface (m35) of the reversing assistance application may be extended in the horizontal direction.

In more detail, a horizontal width of the reverse image (m33) of the visual interface (m35) is increased as shown by image (m36), or a horizontal width of the vehicle-peripheral information (m34) is increased as shown by image (m37), so that the visual interface (m35) may be extended in the horizontal direction. In this case, the visual interface (m35) of the reversing assistance application may be displayed over all parts of the main display region and some parts of the auxiliary display region. Meanwhile, the auxiliary information (a2) of the air-conditioner control application of the auxiliary display region may not be displayed on the auxiliary display region according to extension of the visual interface (m35) of the reversing assistance application. In this case, instead of the auxiliary information (a2) of the air-conditioner control application, the menu (m39) for changing information related to the reverse operation or associated configuration may be displayed on the auxiliary display region.

Figure 6E:
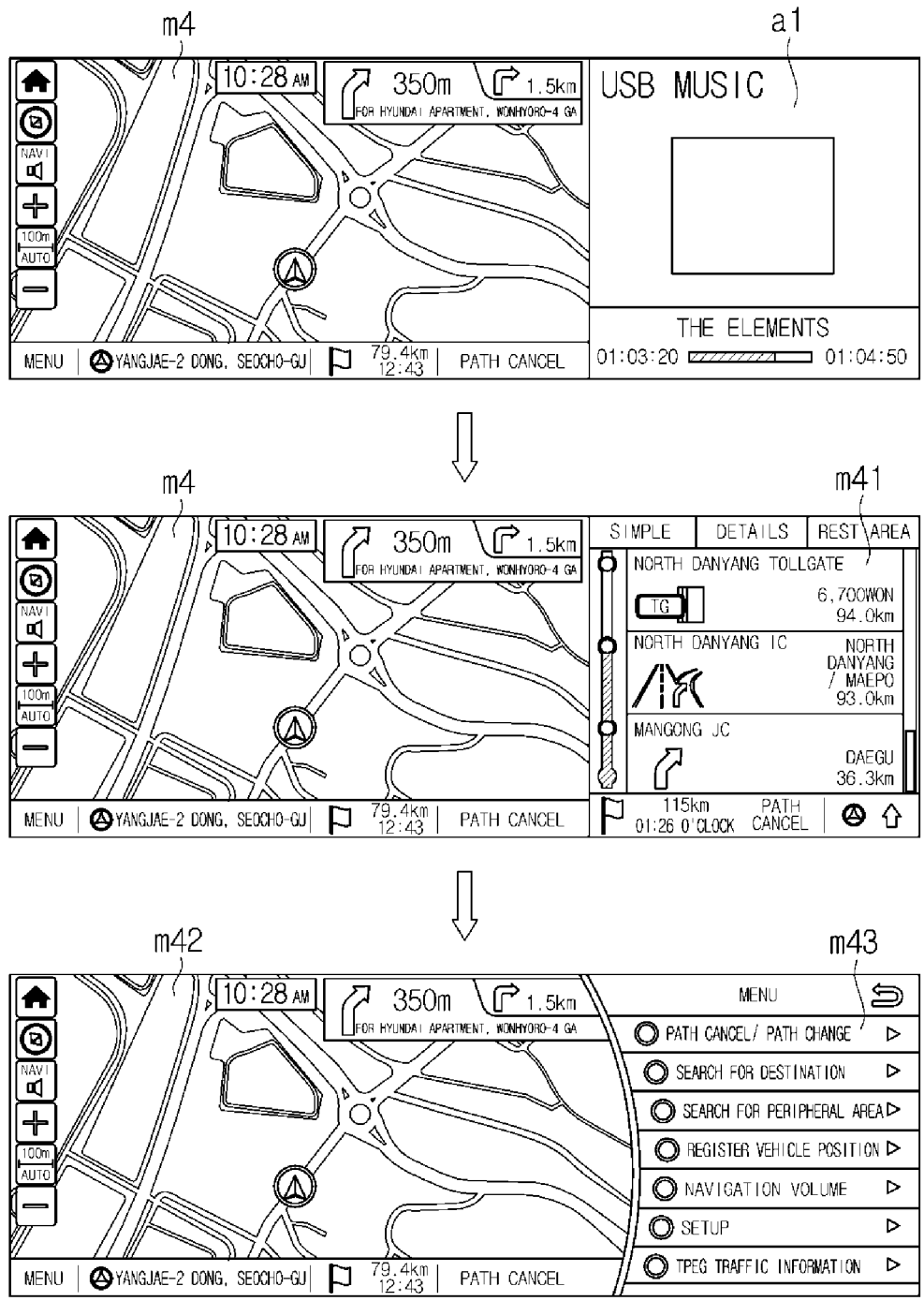

In another example, as shown in FIG. 6E, the visual interface (m34) of the navigation application may be displayed on the main display region, and the auxiliary information (a1) related to the sound playback application may be displayed on the auxiliary display region. In this case, the visual interface (m4) of the navigation application may include a map. If the user manipulates the input units 213, 214, 221, 222, 232-234 or conducts a touch action on the touch panel, the auxiliary information (m41) related to navigation may be displayed, instead of the auxiliary information (a1) related to the sound playback application displayed on the auxiliary display region, so that the visual interface (m4) of the navigation application may be extended in the horizontal direction. In this case, the auxiliary information (m41) related to the navigation may include one or more events on the path as shown in FIG. 6E.

In accordance with one embodiment, if the user manipulates the input units 213, 214, 221, 222, 232-234 once more and conducts a touch action on the touch panel, the auxiliary information (m41) related to navigation displayed on the auxiliary display region may be changed as shown in FIG. 6E. For example, as can be seen from FIG. 6E, instead of one or more events on the path, a setup change menu (m43) such as a path change may be displayed on the auxiliary display region.

Figure 6F:
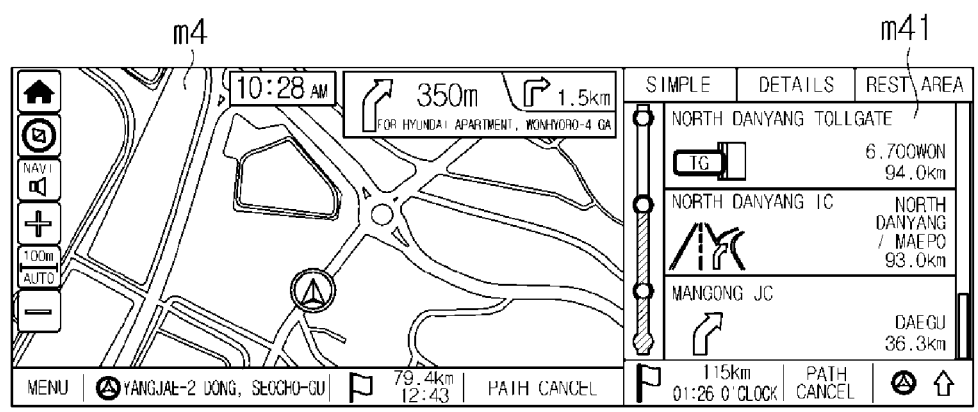
Figure 6F:
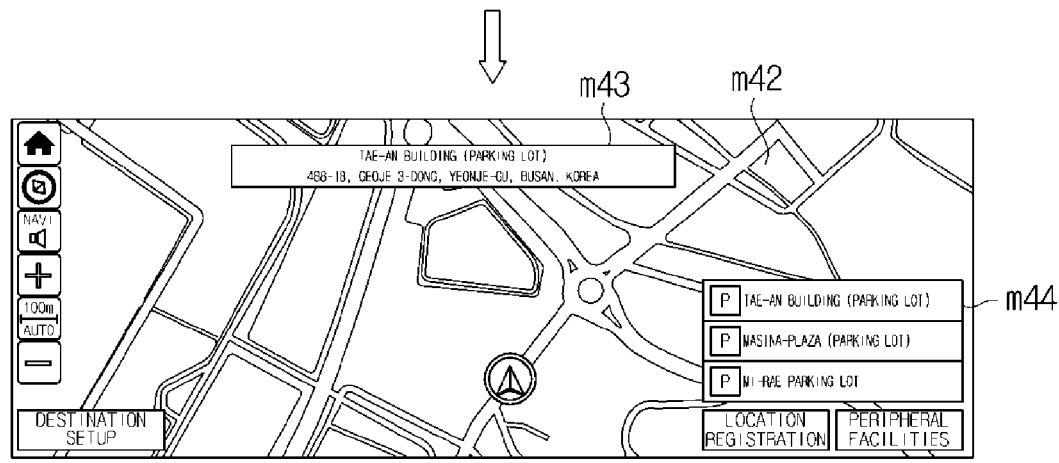

In accordance with another embodiment, as can be seen from FIG. 6F, after the auxiliary information (m41) related to navigation is displayed on the auxiliary display region, if the user manipulates the input units 213, 214, 221, 222, 232-234 once more and/or conducts a touch action on the touch panel, the map of the visual interface (m4) of the navigation application is extended, and the extended map (m42) may be displayed on both the main display region and the auxiliary display region. In this case, various types of information (m43, m44) needed by the user may overlap with the extended map. Of course, even when other auxiliary information (e.g., the sound playback application (a1)) is displayed as the auxiliary information, the map of the visual interface (m4) may be extended according to user manipulation, and the extended map (m42) may also be displayed on the main display region and the auxiliary display region.

Figure 7:
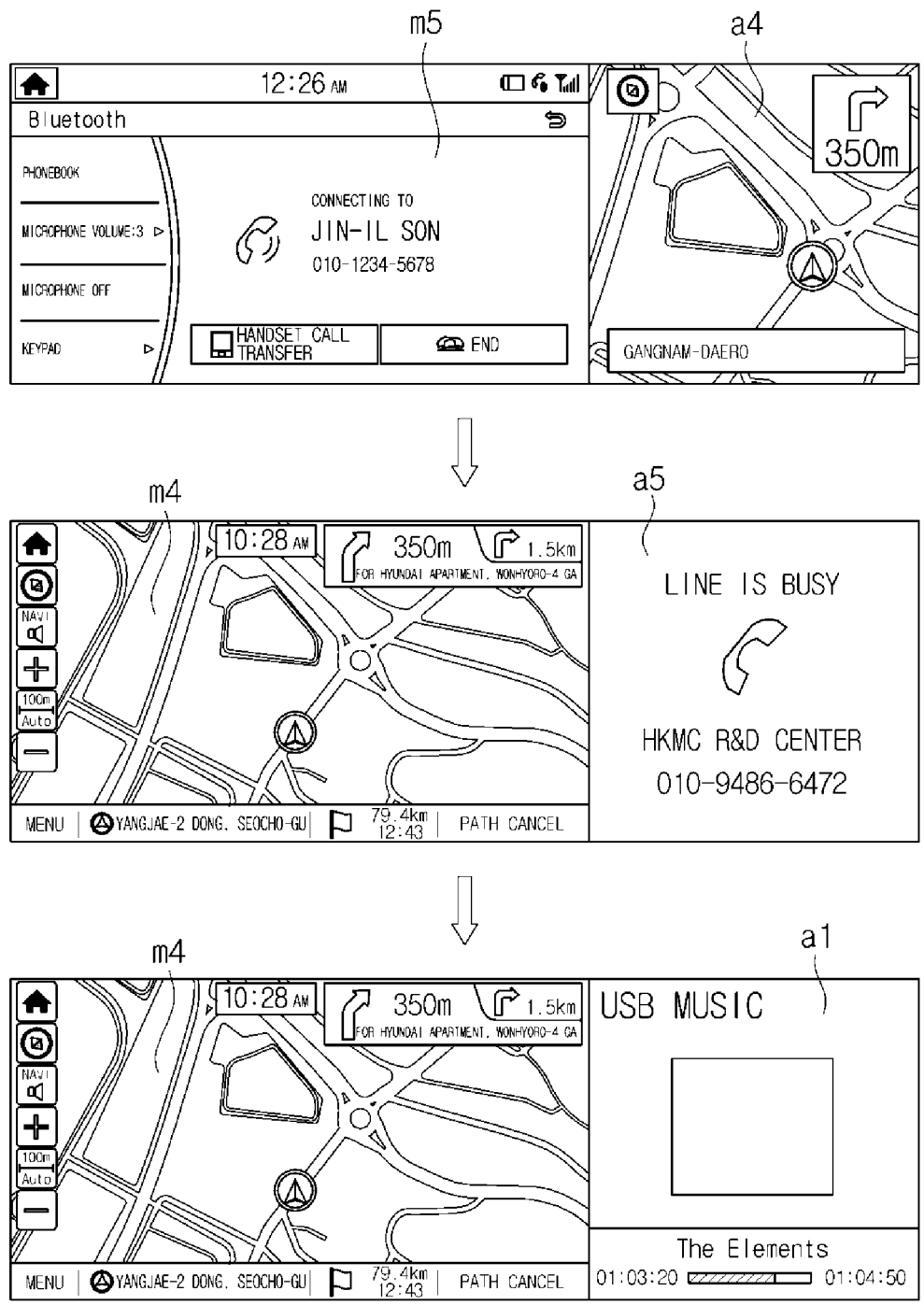
FIG. 7 illustrates an example in which the application exchanges display regions according to an embodiment of the present disclosure.

FIG. 7 illustrates an example in which the application exchanges display regions according to an embodiment of the present disclosure. In accordance with the subject disclosure, the application displayed on the main display region (m) and the other application displayed on the auxiliary display region (a) may be exchanged with each other as shown in FIG. 7. In other words, if a first visual interface related to a first application is displayed in the main display region (m), and if the auxiliary information related to a second application is displayed on the auxiliary display region (a), a second visual interface related to the second application may be displayed in the main display region (m) according to the user manipulation or the predefined configuration, and the auxiliary information related to the first application may be displayed in the auxiliary display region (a).

For example, as shown in the swap example of FIG. 7, if the user receives a phone call from another party during vehicle traveling, the conversation application is executed on the main display region and the visual interface (m5) of the conversation application may be mandatorily displayed in the main display region. For example, the legacy auxiliary information, for example, the auxiliary information (a4) related to the navigation application, may be continuously displayed on the auxiliary display region.

The above-mentioned conversation application may not be executed in a specific state. For example, if the reversing assistance application is first executed, execution of the conversation application may be interrupted. In this case, if the user receives a phone call from another party, the visual interface related to the auxiliary information (a4) displayed in the auxiliary display region, i.e., the visual interface related to the navigation application, may be displayed in the main display region. The auxiliary information related to the visual interface (m5) displayed in the main display region, i.e., the auxiliary information (a5) related to the conversation application, may be displayed in the auxiliary display region. In other words, according to the predefined configuration, i.e., according to a predetermined condition indicating that the user receives a phone call from another party, information displayed in the main display region may be exchanged with information displayed in the auxiliary display region. In addition, the auxiliary information is changed to the visual interface related to the auxiliary information, and the visual interface may be changed to the auxiliary information related to the visual interface. Accordingly, the position and format of the application may be changed and displayed.

In accordance with the embodiment, even when the user receives a phone call from another party, the visual interface related to the conversation application may be displayed in the main display region, and the auxiliary information related to the navigation application may be displayed in the auxiliary display region. In this case, if the user manipulates the input units 213, 214, 221, 222, 232-234 and/or conducts a touch action on the touch panel, information displayed in the main display region may be exchanged with information displayed in the auxiliary display region as necessary.

If the phone call between the user and another party is terminated, the auxiliary information (a5) related to the conversation application displayed in the auxiliary display region may be changed to other auxiliary information because of such call-connection termination. In accordance with the embodiment, other auxiliary information to be changed may be identical to the auxiliary information irrelevant to the visual interface displayed in the main display region. In this case, the changed auxiliary information may be identical to the auxiliary information related to the visual interface displayed in the main display region, prior to reception of the incoming call. For example, if the visual interface related to the sound playback application may be displayed in the main display region prior to reception of the incoming call, the auxiliary information (a1) related to the sound playback application may be displayed in the auxiliary display region after completion of telephone conversation.

In accordance with the embodiment, upon completion of telephone conversation, the visual interface and the auxiliary information having been displayed before reception of the telephone conversation may also be displayed in the main display region and the auxiliary display region, respectively. For example, assuming that, prior to reception of a phone call from another party, the visual interface related to the sound playback application may be displayed in the main display region and the auxiliary information (a4) related to the navigation application may be displayed in the auxiliary display region, the auxiliary information (a5) related to the conversation application may be displayed in the auxiliary display region during telephone conversation. Upon completion of the telephone conversation, the visual interface related to the sound playback application may be displayed in the main display region, and the auxiliary information (a4) related to the navigation application may also be displayed in the auxiliary display region.

Meanwhile, assuming that the reversing assistance application is not executed, if the conversation application is first executed and the reversing assistance application is performed, the visual interface of the conversation application is displayed in the main display region, the visual interface related to the reversing assistance application is displayed in the main display region according to execution of the reversing assistance application, and the auxiliary information related to the communication application may also be displayed in the auxiliary display region.

Figure 8A:
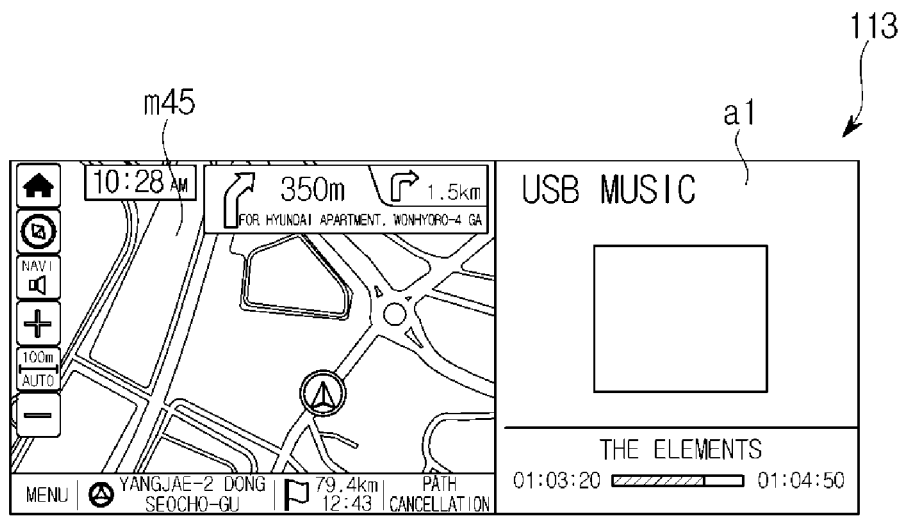
FIGS. 8A and 8B illustrate arrangement of a main display region and an auxiliary display region displayed on a screen according to a screen size of the display device according to an embodiment of the present disclosure.
Figure 8B:
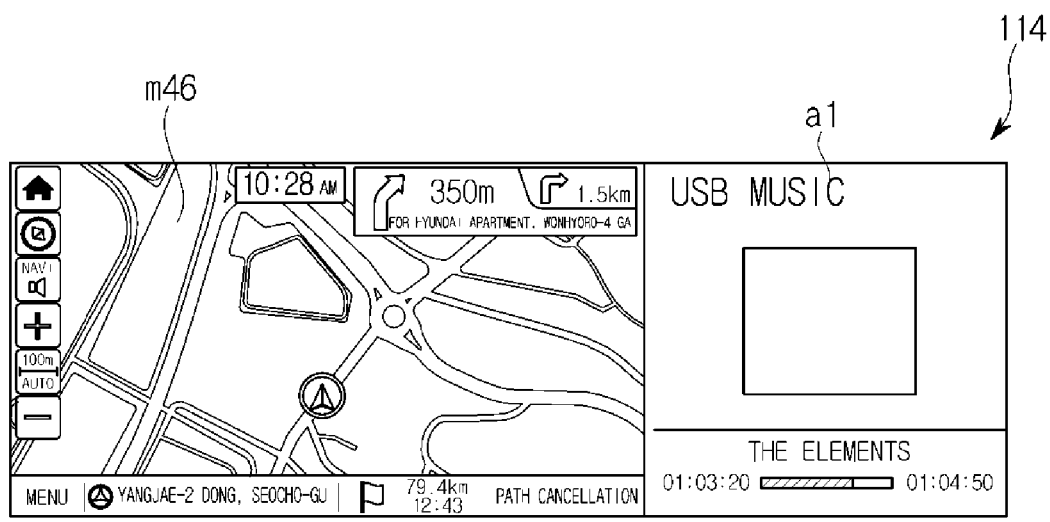
Figure 9A:
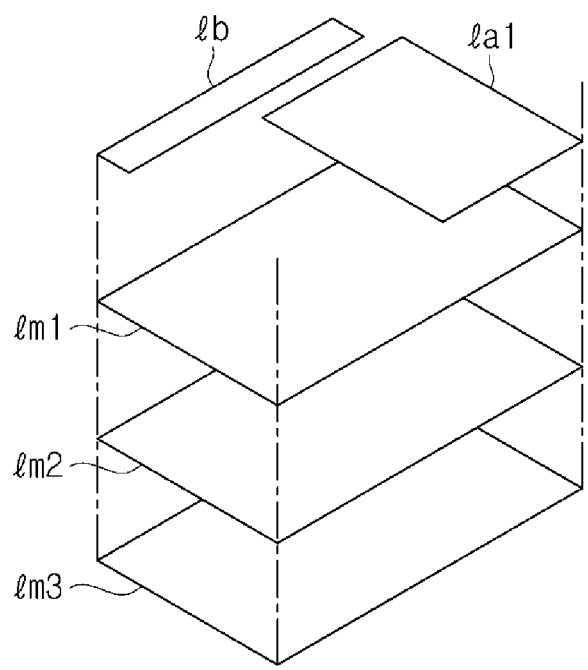
FIG. 9A illustrates image layers comprised of a visual interface and auxiliary information respectively displayed on a main display region and an auxiliary display region of a general-screen display device according to an embodiment of the present disclosure.

A method for displaying the visual interface and the auxiliary information will hereinafter be described with reference to FIGS. 8A to 9B. FIGS. 8A and 8B illustrate arrangement of a main display region and an auxiliary display region displayed in a screen according to a screen size of the display device according to an embodiment of the present disclosure. FIG. 9A illustrates image layers comprised of a visual interface and auxiliary information respectively displayed in a main display region and an auxiliary display region of a general-screen display device according to an embodiment of the present disclosure.

FIG. 8A shows a general screen image 113 having the aspect ratio of 1:1.77 for use in the vehicle display device, and FIG. 8B shows a widescreen image 114 having the aspect ratio of 1:2.66 for use in the vehicle display device. Referring to FIGS. 8A and 8B, since the general screen image 113 and the widescreen image 114 have different aspect ratios, the visual interfaces (m45, m46) may be displayed in the main display region, and the auxiliary information (a1) may not be displayed in the auxiliary display region. If the same visual interfaces (m45, m46) and the auxiliary information (a1) are displayed on screens having different aspect ratios, letters, symbols, or images may be modified.

Figure 9B:
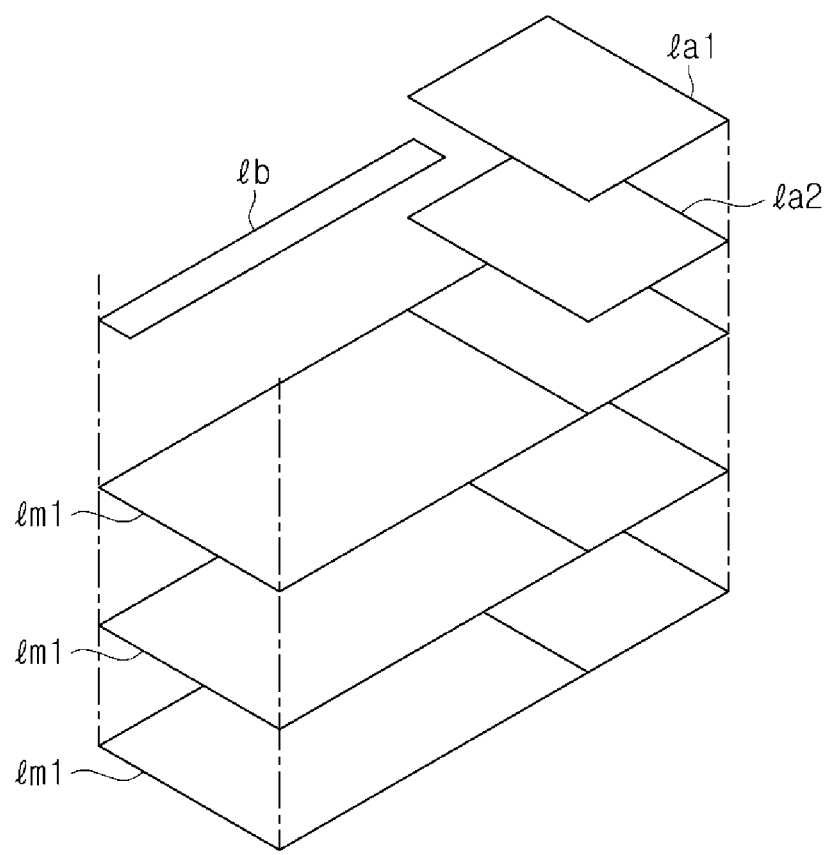
FIG. 9B illustrates image layers comprised of a visual interface and auxiliary information respectively displayed on a main display region and an auxiliary display region of a wide-screen display device according to an embodiment of the present disclosure.
Figure 10:
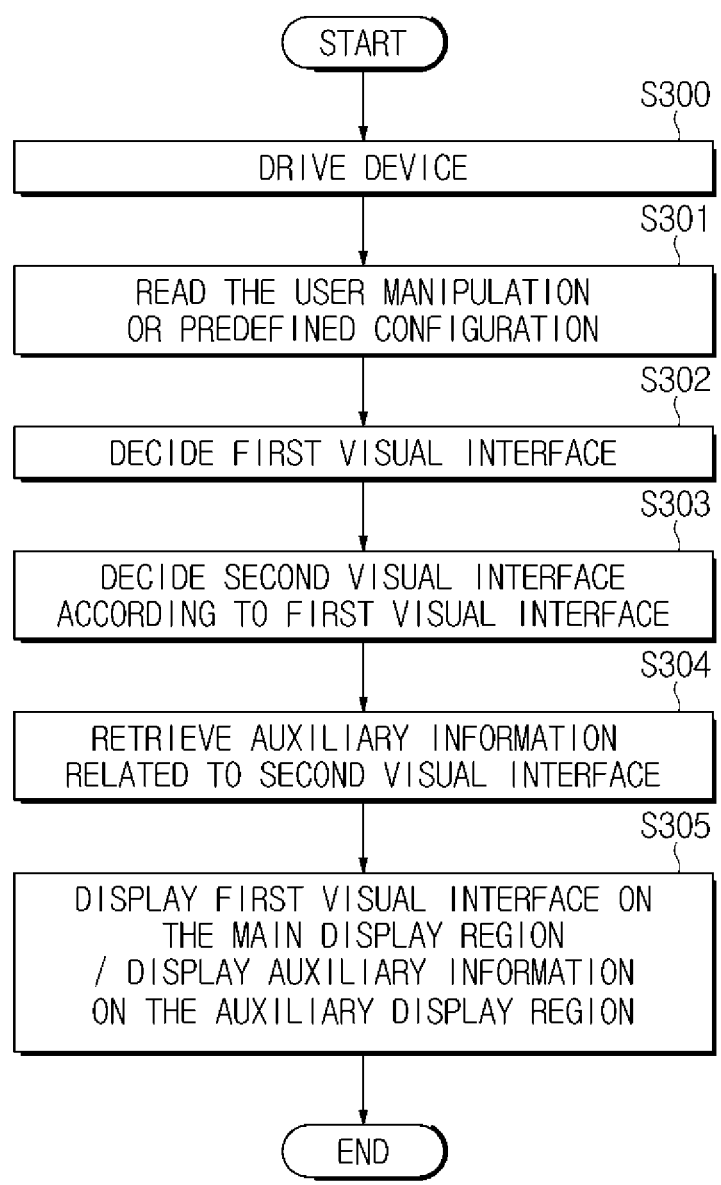
FIGS. 10 to 13 are flowcharts illustrating methods for controlling a display device for a vehicle.

In accordance with the embodiment, the visual interface (m) and the auxiliary information (a) may be respectively comprised of layers (lm1-lm6, la1-la2) as shown in FIGS. 9A and 9B. In more detail, layers (lm1-lm3) of a plurality of visual interfaces corresponding to individual applications may be respectively allocated to the individual applications, and layers (la1, la2) of a plurality of auxiliary information corresponding to individual applications may be provided.

Layers (lm1-lm3) of a plurality of visual interfaces may have the same size and ratio whereas they have different contents. Likewise, the layers (la1, la2) of the plurality of auxiliary information may have the same size and ratio whereas they have different contents.

The layers (lm1 to lm3) of the visual interfaces and the layers (la1, la2) of the plurality of auxiliary information may be arranged in different ways according to whether the vehicle display device has a general screen image 113 or a widescreen image 114. As shown in FIG. 9A, if the vehicle display device has the general screen image 113, layers (la1, la2) of the auxiliary information may overlap with layers (lm1-lm3) of the visual interface, so that some parts of the layers (lm1-lm3) of the visual interface may not be displayed to the outside. If the vehicle display device has the widescreen image 114, layers (la1, la2) of the auxiliary information may be arranged not to overlap with some parts of the layers (lm1-lm3) of the visual interface as shown in FIG. 9A. Therefore, differently from the general screen image 113, all parts of the layers (lm1-lm3) of the visual interface may be displayed to the outside.

In the case of the general screen image 113, the layers (la1, la2) of the auxiliary information overlap with some parts of the layers (lm1-lm3) of the visual interface, a total width of the displayed screen image may be relatively less than that of the widescreen image 114. In contrast, in the case of the widescreen image 114, the layers (la1, la2) of the auxiliary information do not overlap with layers (lm1-lm3) of the visual interface, such that a total width of the display screen may be larger than that of the general screen image 113. Therefore, layers (lm1-lm3) of the visual interface and layers (la1, la2) of the auxiliary information may be displayed in both the general screen 113 and the wide screen 114 not only using the layers (lm1-lm3) of the same visual interface but also using the layers (la1, la2) of the auxiliary information.

In accordance with the embodiment, the layers (lm1-lm3) of the visual interface may include layers of several visual interfaces for a general screen having different sizes and layers of several visual interfaces for a wide screen. Here, the layers for the general screen and the layers for the wide screen may be different in size. The layers (la1, la2) of the plurality of auxiliary information may also include auxiliary information layer for the general screen and the auxiliary information layer for the wide screen. In this case, according to whether the vehicle display device has the general screen 113 or the wide screen 114, the layer corresponding to each screen may be selected.

In accordance with the embodiment, the layer (lb) for indicating the upper bar (b1) may further be provided. In this case, the layer (lb) for indicating the upper bar (b1) may be provided separately from the layers (lm1-lm3) of the visual interface, and may overlap with the other layer (lb) for indicating the upper bar (b1) according to selection of the system designer.

FIGS. 10 to 13 are flowcharts illustrating methods for controlling a display device for a vehicle. A method for controlling the vehicle display device according to the embodiment will hereinafter be described with reference to FIGS. 10 to 13.

The method for controlling the vehicle display device relates to a method for controlling the vehicle display device that can display a screen image including the main display region and the auxiliary display region. In accordance with the embodiment of the vehicle display device shown in FIG. 10, if the vehicle display device is powered on by a vehicle driving action or the like, the vehicle display device may start operation in step S300.

According to either the manipulation result of the input units handled by the user or the predefined configuration in step S301, the processor for controlling the vehicle display device may decide a first visual interface of the first application to be displayed in the main display region in step S302. In accordance with the embodiment, the processor for controlling the vehicle display device may first determine the aspect ratio of the screen of the display unit of the vehicle display device. If the first visual interface is decided, the processor retrieves the first visual interface layer stored in the storage unit or the like. In this case, the processor may also retrieve the first visual interface layer corresponding to the screen aspect ratio.

If the first visual interface of the first application is decided, a second application different from the first application may be decided in step S303. In this case, the first application and the second application may include at least one of a sound playback application, an information provision application, a radio application, a still image display application, a vehicle management application, a navigation application, a conversation application, a voice recognition application, and a reversing assistance application or the like.

If the second application is decided, auxiliary information related to the second application is also decided such that the auxiliary information can be retrieved from the storage unit in step S304. Therefore, the processor may retrieve the layer corresponding to the auxiliary information. In this case, the processor may also retrieve an auxiliary information layer corresponding to the screen aspect ratio. The auxiliary information related to the second application may include summary information related to the second application. The summary information may also be changed according to the user manipulation or the predefined configuration.

If the first visual interface and the auxiliary information are retrieved, the first visual interface may be displayed in the main display region and the auxiliary information may be displayed in the auxiliary display region in step S305. The processor displays the first visual interface layer and the auxiliary layer on the screen, so that it can display the first visual interface and the auxiliary information on the screen. In this case, according to the aspect ratio of the screen, the position of the first visual interface layer and the position of the auxiliary information layer may be decided. If the vehicle display device is extended to the position of the physical gauge panel and further includes a gauge display region, gauge information related to vehicle driving and associated images may further be displayed in the gauge display region.

If the first visual interface and the auxiliary information are displayed, the display screen image may be changed according to user manipulation or the predefined configuration.

Figure 11:
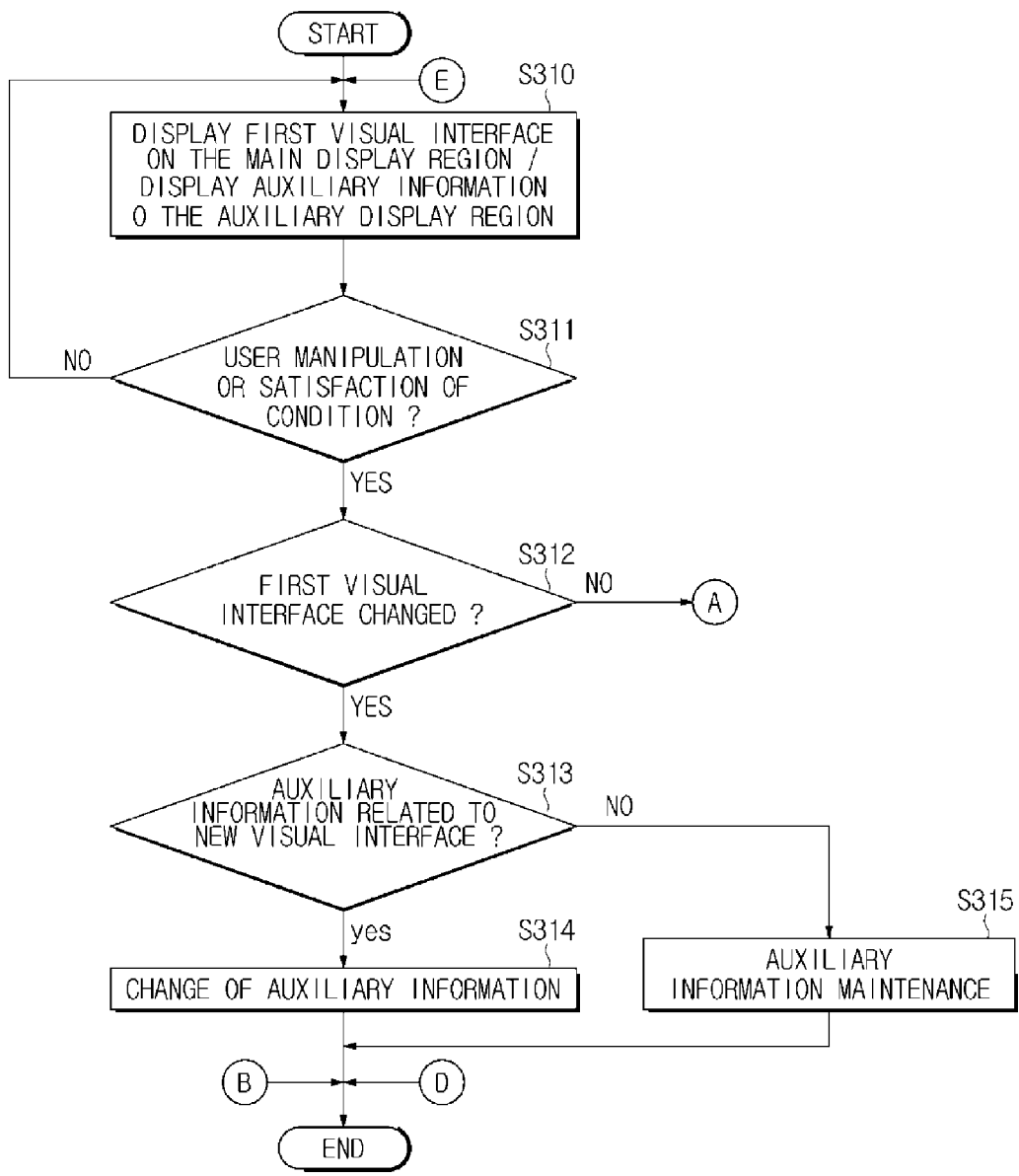

Referring to FIG. 11, after the first visual interface is displayed in the main display region and the auxiliary information is displayed in the auxiliary display region in step S310, the user may manipulate the input unit or the like, or a condition corresponding to the predefined configuration such as execution of the reversing assistance application or execution of the conversation application may also be achieved in step S311.

If the first visual interface is exchanged with another according to user manipulation or satisfaction of a predetermined condition in step S312, the processor may determine whether a newly exchanged visual interface is associated with the auxiliary information in step S313. For example, the processor may determine whether the application related to the newly exchanged visual interface is identical to the application related to the auxiliary information.

If the newly exchanged visual interface is associated with the auxiliary information, i.e., if the application related to the newly exchanged visual interface is identical to the application related to the auxiliary information, the processor may exchange auxiliary information with other information in step S314. In other words, auxiliary information of the application different from the application related to the legacy auxiliary information may be displayed on the auxiliary display region.

If the newly exchanged visual interface is not associated with the auxiliary information, i.e., if the application related to the newly exchanged visual interface is not identical to the application related to the auxiliary information, the processor may control the legacy auxiliary information to be continuously displayed in the auxiliary display region in step S315. Of course, even when the newly exchanged visual interface is not associated with the auxiliary information, the legacy auxiliary information may be exchanged with other information.

Figure 12:
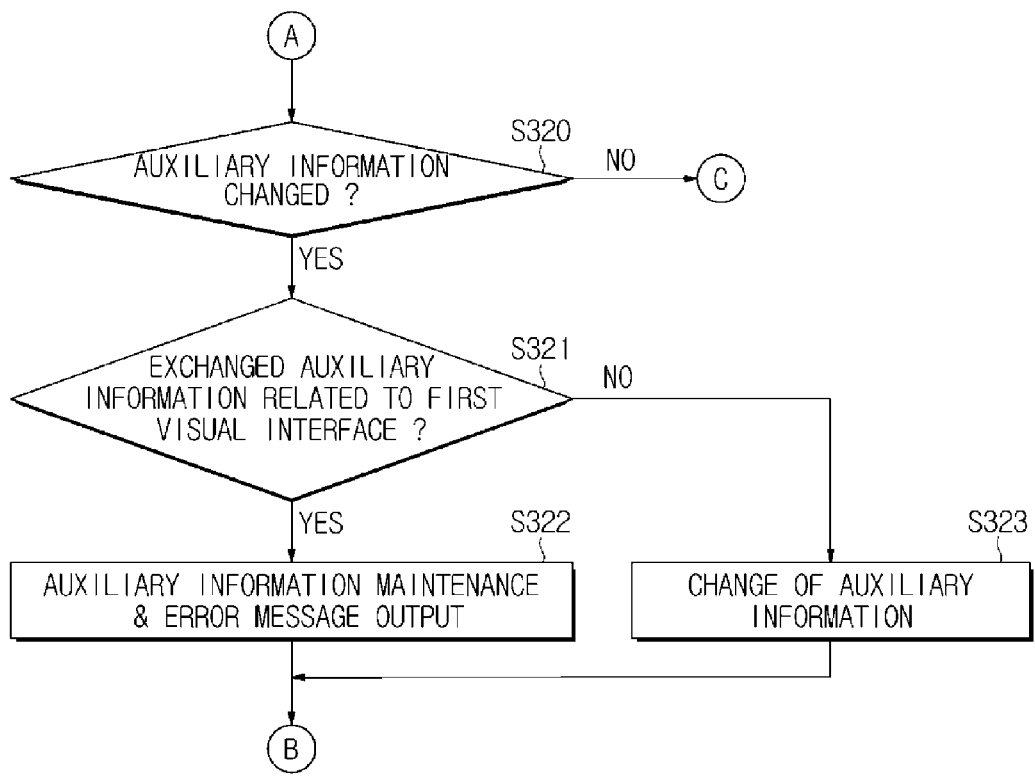

Referring to FIG. 12, the auxiliary information may be exchanged with another according to user manipulation or satisfaction of a predetermined condition in step S320. In this case, if the exchanged auxiliary information is associated with the first visual interface in step S321, i.e., if the application related to the exchanged auxiliary information is a first application related to the first visual interface, the processor may not exchange the auxiliary information irrespective of the user manipulation or satisfaction of a predetermined condition, and may control the legacy auxiliary information to be continuously displayed in the auxiliary display region in step S322. The processor may output an error message on the screen as necessary.

If the exchanged auxiliary information is not associated with the first visual interface in step S321, i.e., if the application related to the exchanged auxiliary information is not identical to the first application related to the first visual interface, the auxiliary information corresponding to user manipulation or satisfaction of a predetermined condition is displayed in the auxiliary display region so that the auxiliary information may be exchanged with other information in step S323.

Figure 13:
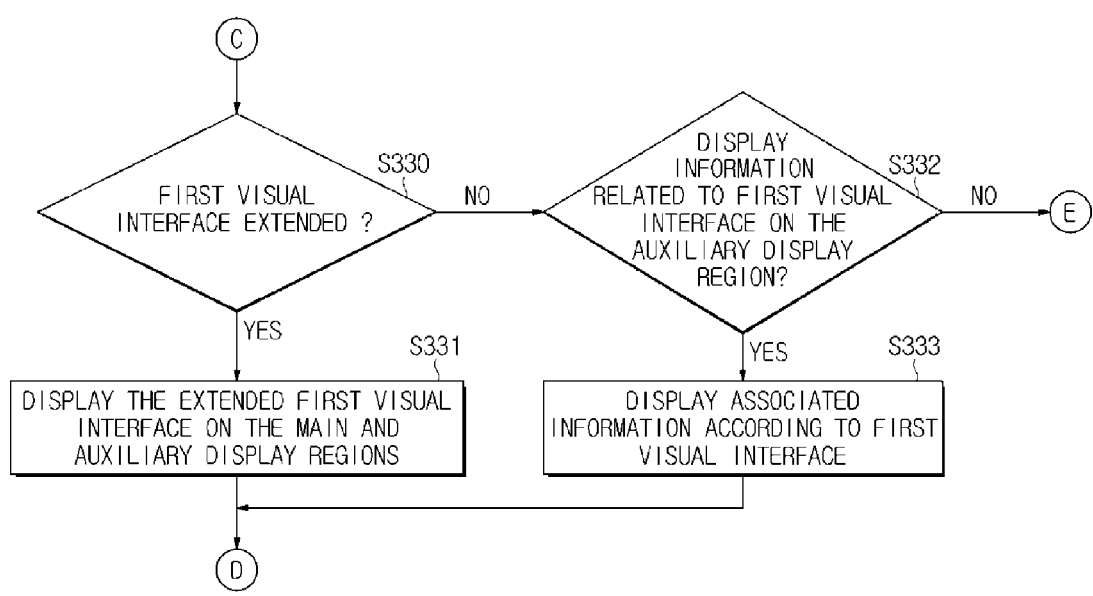

Referring to FIG. 13, if the first visual interface is displayed not only on the main display region but also on the auxiliary display region according to user manipulation or satisfaction of a condition in step S330, the first visual interface is extended in a direction of the auxiliary display region, so that the first visual interface may also be displayed in the auxiliary display region. In this case, letters, symbols, or images of the first visual interface may be elongated or the positions thereof are shifted, so that the first visual interface is increased in size and thus the first visual interface may also be displayed in the auxiliary display region.

If the first visual interface and associated information will be displayed in the auxiliary display region according to user manipulation or satisfaction of a condition in step S332, information related to the first visual interface (e.g., the selection menu related to the first visual interface) may be displayed in the auxiliary display region in step S333. Therefore, the first visual interface may be extended to the auxiliary display region and displayed thereon.

As is apparent from the above description, the vehicle display device, the vehicle including the vehicle display device, and the method for controlling the vehicle display device according to the embodiments of the present disclosure can simultaneously provide various kinds of information through one screen. The vehicle display device, the vehicle including the vehicle display device, and the method for controlling the vehicle display device according to the embodiments of the present disclosure can efficiently and effectively provide a user with various kinds of information using a large-sized screen of the vehicle display device. The vehicle display device, the vehicle including the vehicle display device, and the method for controlling the vehicle display device according to the embodiments of the present disclosure can optimize various kinds of information for the user in response to a screen size of the vehicle display device, and display and provide the optimized information.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A display device for a vehicle comprising:
a display unit to: display a wide screen that is divided into a main display region and an auxiliary display region; and
a controller having a memory configured to store program instructions and a processor configured to execute the program instructions, the controller configured to: display a first visual interface of a first application on the main display region, ascertain a second application different from the first application, and display auxiliary information related to the second application on the auxiliary display region,
wherein, when the first application is changed into a new application, the controller is further configured to determine whether the new application is identical to the second application and configured to exchange the second application with another application when it is determined that the new application is identical to the second application.

2. The display device according to claim 1, wherein:
if a second visual interface of the second application is displayed on the main display region, auxiliary information related to the first application different from the second application or auxiliary information related to a third application different from the second application is displayed on the auxiliary display region.

3. The display device according to claim 1, wherein the controller displays auxiliary information of a third application, instead of the auxiliary information related to the second application, on the auxiliary display region according to user manipulation or a predefined configuration,
wherein the third application is different from the first application and the second application.

4. The display device according to claim 1, wherein:
according to user manipulation or a predetermined configuration, the controller extends the first visual interface to the main display region and the auxiliary display region, and respectively displays the first visual interface and information related to the first visual interface on the main display region and the auxiliary display region.

5. The display device according to claim 4, wherein the information related to the first visual interface includes a selection menu related to execution of the first application.

6. The display device according to claim 1, wherein the controller displays a third visual interface of a third application on the main display region according to user manipulation or a predefined configuration.

7. The display device according to claim 6, wherein:
after the controller displays the third visual interface of the third application on the main display region and displays auxiliary information related to the second application on the auxiliary display region, the controller displays a second visual interface of the second application on the main display region and displays auxiliary information related to the third application on the auxiliary display region.

8. The display device according to claim 1, wherein
the auxiliary information related to the second application includes summary information related to the second application, and
the summary information is changeable according to user manipulation or a predefined configuration.

9. The display device according to claim 1, further comprising:
a storage unit to store a plurality of visual interface layers corresponding to a plurality of visual interfaces and a plurality of auxiliary information layers corresponding to a plurality of auxiliary information related to the plurality of visual interfaces.

10. The display device according to claim 1, wherein the controller respectively selects at least one of the plurality of visual interface layers and at least one of the plurality of auxiliary information layers according to user manipulation or a predefined configuration.

11. The display device according to claim 1, wherein
the first application and the second application are selected from the group consisting of: at least one of a sound playback application; an information provision application; a radio application; a still image display application; a vehicle management application; a digital media broadcast playback application; a navigation application; a conversation application; a voice recognition application; and a reversing assistance application.

12. The display device according to claim 1, wherein the display unit further includes a gauge display region on which gauge information related to vehicle driving and associated images are displayed.

13. A display device for a vehicle comprising:
a display unit configured to display a screen; and
a controller having a memory configured to store program instructions and a processor configured to execute the program instructions, the controller configured to determine whether the screen is a general screen or a wide screen, determine the size of a main display region of the screen and the size of an auxiliary display region of the screen according to the determined result, display a first visual interface on the main display region, and display auxiliary information related to a second visual interface configured to perform processing different from that of the first visual interface on the auxiliary display region,
wherein, when the first visual interface is changed into a new visual interface, the controller is further configured to determine whether the new visual interface is identical to the second visual interface and configured to exchange the auxiliary information with other information when it is determined that the new visual interface is identical to the second visual interface.

14. A vehicle comprising:
a display unit configured to display a wide screen that is divided into a main display region and an auxiliary display region; and
a controller having a memory configured to store program instructions and a processor configured to execute the program instructions, the controller configured to display a first visual interface of a first application on the main display region, and display auxiliary information related to a second application different from the first application on the auxiliary display region,
wherein, when the first application is changed into a new application, the controller is further configured to determine whether the new application is identical to the second application and configured to exchange the second application with another application when it is determined that the new application is identical to the second application.

15. A method for controlling a vehicle display device having a display unit configured to display a wide screen divided into a main display region and an auxiliary display region, the method comprising:
 determining a first visual interface of a first application;
 determining a second application;
 displaying the first visual interface on the main display region, and displaying auxiliary information related to the second application on the auxiliary display region;
 changing the first application into a new application;
 determining whether the new application is identical to the second application;
 exchanging the second application with another application when it is determined that the new application is identical to the second application; and
 displaying a new visual interface of the new application and auxiliary information related to the other application,
 wherein the first application and the second application are configured to perform different processes.

16. The method according to claim 15, further comprising:
 displaying a third visual interface of a third application on the main display region according to user manipulation or a predefined configuration.

17. The method according to claim 16, further comprising:
 displaying a third visual interface on the main display region and displaying auxiliary information related to the second application on the auxiliary display region; or
 displaying a second visual interface of the second application on the main display region and displaying auxiliary information related to the third application on the auxiliary display region.

18. The method according to claim 15, wherein the displaying the first visual interface on the main display region and the displaying auxiliary information related to the second application on the auxiliary display region includes:
 selecting a visual interface layer corresponding to the determined first visual interface from among a plurality of visual interface layers, and displaying the selected visual interface layer on the main display region; and
 selecting an auxiliary information layer corresponding to the auxiliary information of the second visual interface of the determined second application, and displaying the selected auxiliary information layer on the auxiliary display region.

19. The method according to claim 15, wherein the first application and the second application include at least one of a sound playback application, an information provision application, a radio application, a still image display application, a vehicle management application, a navigation application, a conversation application, a voice recognition application, and a reversing assistance application.

20. The method according to claim 15, further comprising:
 displaying gauge information related to vehicle driving and associated images on a gauge display region.

21. The display device according to claim 4, wherein the controller extends the first visual interface to the main display region and at least a portion of the auxiliary display region according to a user manipulation or a predefined configuration.

22. The display device according to claim 6, wherein, when a predetermined condition is satisfied and the third application is related to the predetermined condition, the controller mandatorily exchanges the first application into the third application so that the third visual interface is displayed on the main display region or mandatorily exchanges the second application into the third application so that auxiliary information related to the third application is displayed on the auxiliary display region.

23. The display device according to claim 22, wherein, when the first application or the second application is a predetermined specific application, the controller maintains the first visual interface displayed on the main display region or the auxiliary information related to the second application displayed on the auxiliary display region, even when the predetermined condition is satisfied.

* * * * *